(12) United States Patent
Ikeda et al.

(10) Patent No.: US 6,217,454 B1
(45) Date of Patent: Apr. 17, 2001

(54) TRIPOD TYPE CONSTANT VELOCITY JOINT

(75) Inventors: Toshihiro Ikeda, Takasaki; Minoru Ishijima, Isasaki; Yasumasa Mizukoshi, Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/101,621

(22) PCT Filed: Jan. 8, 1997

(86) PCT No.: PCT/JP97/00017

§ 371 Date: Sep. 11, 1998

§ 102(e) Date: Sep. 11, 1998

(87) PCT Pub. No.: WO97/25545

PCT Pub. Date: Jul. 17, 1997

(30) Foreign Application Priority Data

Jan. 12, 1996 (JP) .................................................. 8-004073
May 31, 1996 (JP) .................................................. 8-138335
Oct. 31, 1996 (JP) .................................................. 8-290297

(51) Int. Cl.$^7$ ...................................................... F16D 3/26
(52) U.S. Cl. ........................................... 464/111; 464/124
(58) Field of Search ................................... 464/111, 123, 464/124, 129, 132, 905

(56) References Cited

U.S. PATENT DOCUMENTS

| | | | |
|---|---|---|---|
| 4,571,214 | * 2/1986 | Orain | 464/124 X |
| 4,786,270 | * 11/1988 | Iwasaki | 464/124 X |
| 5,507,693 | * 4/1996 | Schwarzler et al. | 464/124 X |
| 5,788,577 | * 8/1998 | Kadota et al. | 464/111 |

FOREIGN PATENT DOCUMENTS

| | | |
|---|---|---|
| 4301207C1 | 6/1994 | (DE) . |
| 2 259 557 | 3/1993 | (GB) . |
| 57-13210 | 3/1982 | (JP) . |
| 3-1528 | 1/1991 | (JP) . |
| 3-1529 | 1/1991 | (JP) . |
| 3-172619 | 7/1991 | (JP) . |
| 4-282028 | 10/1992 | (JP) . |
| 5-67821 | 9/1993 | (JP) . |
| 7-15289 | 2/1995 | (JP) . |
| 7-113379 | 12/1995 | (JP) . |
| WO 90/06452 | 6/1990 | (WO) . |
| WO 95/23928 | 9/1995 | (WO) . |

OTHER PUBLICATIONS

Patent Abstract of Japan, vol. 11, No. 125 (M–582) [2572], Apr. 18, 1987 & JP 61 266830 A (NTN TOYO) Nov. 26, 1986.

Patent Abstract of Japan, vol. 14, No. 69 (M–932), May 16, 1990 & JP 01 288625A (TOYODA), Nov. 20, 1989.

Patent Abstract of Japan, vol. 95, No. 10, Nov. 30, 1995 & JP 07 174155 A (Yasuhiro), Jul. 11, 1995.

* cited by examiner

*Primary Examiner*—Anthony Knight
*Assistant Examiner*—Greg Binda
(74) *Attorney, Agent, or Firm*—Evenson, McKeown, Edwards & Lenahan, P.L.L.C.

(57) ABSTRACT

A constant velocity joint of a tripod type comprising a housing formed with three recesses having first and second guide grooves each extending axially in the housing, a tripod comprising trunnions with a bearing assembly having an inner roller and an outer roller in a rolling contact relationship and the first and second guide grooves formed such that the outer roller is tightly pressed on the first guide groove when a rotating force is transmitted, and that the axis of each of the trunnions is displaced from a parallel relationship with the flat bottom face of the first guide groove when the outer roller is pressed thereon with the joint angle kept zero.

3 Claims, 19 Drawing Sheets

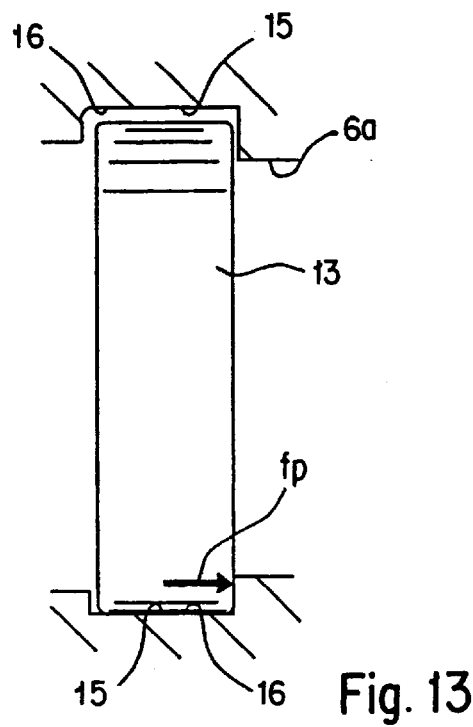
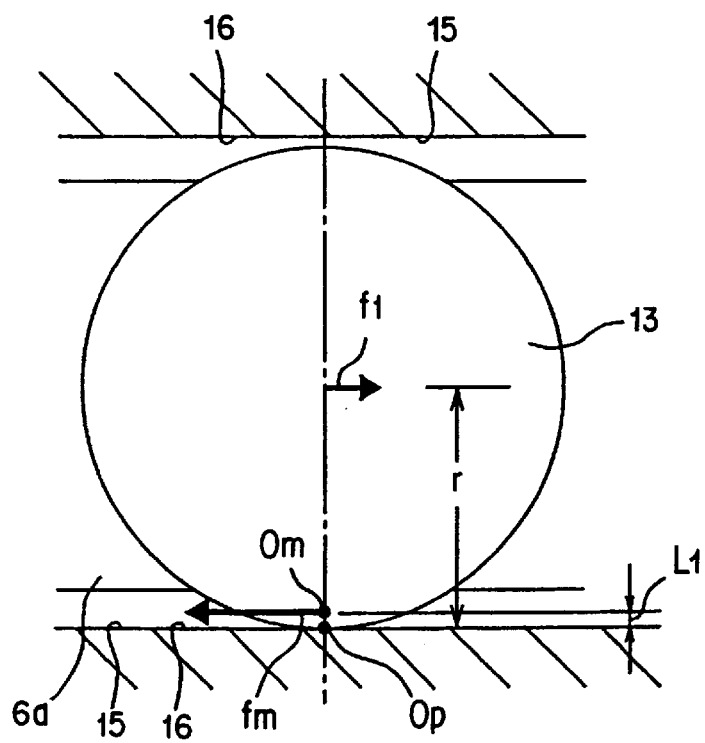
Fig. 13
Fig. 14

TRIPOD TYPE CONSTANT VELOCITY JOINT

FIELD OF THE INVENTION

The present invention is related to a tripod type constant velocity joint incorporated into a drive system of an automobile or the like, for effecting transmission of a rotational force between a pair of non aligned rotating shafts.

DESCRIPTION OF THE RELATED ART

Tripod type constant velocity joints have been widely used in the past as one type of constant velocity joint incorporated into automobile drive systems. For example Japanese Unexamined Patent Publication KOKAI Nos. 63-186036, and 62-233522, disclose a tripod type constant velocity joint 1 as shown in FIGS. 1 and 2 where some internal parts are depicted by dotted lines in FIG. 1. Such a constant velocity joint 1 comprises a hollow cylindrical housing 3 which is secured to an end of a first rotating shaft 2 such as the rotating shaft on the wheel side, and a tripod 5 which is connected to an end of a second rotating shaft 4 such as a drive shaft.

Recesses 6 are formed at three locations on the inner peripheral surface of the housing 3 at even spacing around the circumferential direction, and recessed from the respective inner peripheral faces in the radially outward direction of the housing 3.

The tripod 5 connected to the end of the second rotating shaft 4 comprises a boss 7 for attachment to the end of the second rotating shaft 4, and trunnions 8 formed at three locations on the outer peripheral face of the boss 7 at even spacing therearound and formed as cylindrical posts. Around each of the respective trunnions 8, a roller 9 is supported by means of needle bearing 10 so as to be freely rotatable thereabout, and so as to be able to move slightly in the axial direction.

Moreover, the constant velocity joint 1 is assembled by engaging the respective rollers 9 in the recesses 6 on the inner peripheral surface of the housing 3. Respective pairs of inner surface 11 which partly define the respective recesses 6, are formed respectively in an arcuate shape. Consequently, the respectively rollers 9 are supported so as to be able to move and slide freely between the pairs of inner surfaces 11.

When using a constant velocity joint 1 of the abovementioned construction, then for example, as the second rotating shaft 4 rotates, the rotational force is transmitted from the boss 7 of the tripod 5 via the trunnions 8, the needle bearings 10 and the rollers 9 to the housing 3, so that the first rotating shaft 2 which is fixed at an end thereof to the housing 3, is rotated.

On the other hand, as the first rotating shaft 2 rotates, the rotational force is transmitted from the housing 3, via the rollers 9, the needle bearings 10 and the trunnions 8 to the boss 7 of the tripod 5, so that the second rotating shaft 4 fixed at an end thereof to the boss 7 is rotated.

Furthermore, in the case where the axis of the first rotating shaft 2 and the axis of the second rotating shaft 4 are out of alignment, in other words, when the constant velocity joint 1 has a joint angle, then the trunnions 8 swing about the boss 7 of the tripod 5 accompanying rotation of the first and second rotating shafts 2 and 4 as shown in FIGS. 1 and 2, so that the trunnions 8 are displaced relative to the inner side faces 11 of the respective recesses 6. At this time, the rollers 9 supported on the respective trunnions 8 roll on the inner surfaces of the respective recesses 6, and move axially along the respective trunnions 8. Due to these movements, the constant velocity characteristic is maintained between the first and second rotating shafts 2 and 4 as well known in the art.

In the case of the constant velocity joint 1 constructed and operated as described above, when the first and second rotating shafts 2 and 4 are rotated with a joint angle therebetween, the respective rollers 9 carry out a complicated movement. That is to say, in this condition the respective rollers 9 move in the axial direction of the housing 3 along the inner side faces 11 of the recesses 6 while their orientation changes, and also move axially along the trunnions 8. When the rollers 9 are subjected to this complicated movement, the relative displacement between the outer peripheral faces of the rollers 9 and the inner side faces 11 of the recesses is not always carried out smoothly, so that a relatively large force, referred to as "axial force", is produced between the faces. As a result, in the case of the constant velocity joint of the construction shown in FIGS. 1 and 2, then three axial forces are produced for each rotation. Furthermore, then in exceptional cases, e.g. when fitted to an automobile with for example a large torque being transmitted under large joint angle conditions, a vibration known as shudder can occur.

The constant velocity joint 1 shown in FIGS. 3 through 5 is disclosed in Japanese Unexamined Patent Publication KOKAI No. 63-186036, as a construction to suppress vibrations arising from the above cause. In the case of this improved type constant velocity joint 1, instead of the rollers 9 in FIGS. 1 and 2, a set of inner rollers 12 and outer rollers 13 are provided on the respective trunnions 8.

The inner rollers 12 are respectively formed with cylindrical inner peripheral faces and spherical convex outer peripheral faces, and are supported on bearings 14 so as to be only rotatable about the respective trunnions 8. Moreover, the outer rollers 13 are formed with cylindrical inner peripheral faces so that the inner rollers 12 are engaged thereinside, such that the inner rollers 12 are able to swing and be displaced in the axial direction of the respective outer rollers 13.

Moreover, provided in pairs for each of the recesses 6 on the inner peripheral surface of housing 3 are guide faces 15 with which the outer peripheral faces of the outer rollers 13 are in rolling contact, so as to move only in the axial direction of housing 3 (left and right directions in FIG. 3 and FIG. 5, the front and rear directions in FIG. 4).

With the improved constant velocity joint 1 constructed as described above, the displacement of the set of rollers 12, 13 in the axial direction of the housing 3, is permitted by rotation of the outer rollers 13. Moreover, the swinging or rocking of the set of rollers 12, 13 about the center of the tripod 5, and the displacement along the axial direction of the trunnions 8, are permitted by the swinging or rocking and sliding of the inner rollers 12 relative to the respective outer rollers 13. This displacement of the outer peripheral faces of the respective outer and inner rollers 13 and 12 relative to the mating faces is simpler than the displacement of the rollers 9 in the construction of FIGS. 1 and 2, relative to the inner side faces 11 of the recesses 6 and the trunnions 8, so that stabilized displacement is carried out in the construction in FIGS. 3 through 5. Consequently, the shaft force produced with rotation of the constant velocity joint is reduced, so that even when a large torque is transmitted with a large joint angle, the occurrence of uncomfortable vibrations can be suppressed.

In the case of the second example of the conventional construction shown in FIGS. 3 through 5, the vibration can be suppressed by reducing the axial force, however there is room for improvement from the point of maintaining durability. That is to say, in the case of the tripod type constant velocity joint to which the present invention is addressed, then it is necessary for the outer peripheral faces of the set of rollers 12, 13 to move in the axial direction of the respective trunnions 8. Therefore, in the case of the construction of the second example, the inner peripheral faces of the outer rollers 13 are made cylindrical, and the spherical convex outer peripheral faces of the inner rollers 12 are engaged with the cylindrical inner peripheral faces of the rollers 13 so as to be able to swing and move freely in the axial direction. As a result, the area of the contact portion between the inner peripheral faces of the outer rollers 13 and the outer peripheral faces of the inner rollers 12 becomes small.

When a rotational force is transmitted by means of the constant velocity joint 1, a large load is applied to the contact portion. In the case of the construction of the second example, due to the small area of the contact portion and the rubbing therebetween, the contact portions are rubbed together under a large face pressure. As a result, peeling or flaking occurs at an early stage, and the inner peripheral faces of the outer rollers 13 and the outer peripheral faces of the inner rollers 12 become worn with use over a long period, so that backlash gradually occurs at the engagement portions of the pairs of rollers 13 and 12.

The tripod type constant velocity joint according to the present invention has been developed in view of the above situation, with the outer peripheral faces of the rollers for the respective trunnions made so as to be freely displaced in the axial direction of the trunnions, and also so as to give a construction whereby the area of the contact portions between the inner peripheral faces of the outer rollers, and the outer peripheral faces of the inner rollers is increased.

A construction wherein the rollers are divided into two parts, namely the inner and outer rollers, with the outer peripheral faces of the inner rollers and the inner peripheral faces of the outer rollers engaged in a fitting relationship of spherical face pairs, is disclosed in Japanese Examined Patent Publication KOKOKU NO. 7-15289. However, with the tripod type constant velocity joint of this disclosure, the pairs of inner side faces defining the recess portions formed in the housing, are formed as flat surfaces parallel with each other, and the outer rollers swinging on the flat surfaces are supported as to be only rotatable about the axes of the trunnions while their displacement in the axial direction of the trunnions is not possible, and hence the basic construction of this disclosure with such movements differs from the tripod type universal coupling to which is the present invention is addressed.

SUMMARY OF THE INVENTION

One objective of the present invention is to provide a constant velocity joint of a tripod type comprising a hollow cylindrical housing to be connected to a first rotating shaft, and a tripod contained in the housing so as to be connected to a second rotating shaft, the housing having an inner peripheral surface formed with three recesses spaced apart from each other in a circumferential direction with a uniform space therebetween, each of the recesses having an inner surface formed with a pair of guide grooves each extending axially in the housing, the tripod comprising a base portion through which the tripod is connected to the second rotating shaft, three trunnions each having a first end connected to the base portion and a second end extending to one of the recesses, and a bearing assembly mounted to the second end of each of the trunnions, the bearing assembly having an inner roller provided concentric with each of the trunnions and having a cylindrical inner peripheral face and a spherical convex outer peripheral face, so that the inner roller is rotatable around the trunnion, and an outer roller fitted around the inner roller and having an outer peripheral face and an inner peripheral face, the outer peripheral face received in the pair of guide grooves in the recess, so that the outer roller is placed in a rolling contact relationship with the guide grooves so as to be moved only axially in the housing and the inner peripheral face of the outer roller engaged with the spherical convex outer peripheral face of the inner roller, so that the outer roller has a rocking relationship with the inner roller whereby a minimum friction is achieved.

BRIEF DESCRIPTION OF THE DRAWINGS

FIG. 13 is a schematic view showing the relation between the side face of the outer ring and the side wall of the guide groove.

FIG. 14 is a schematic view looked from right in FIG. 13.

DETAILED DESCRIPTION OF THE PREFERRED EMBODIMENTS

Figure 1:
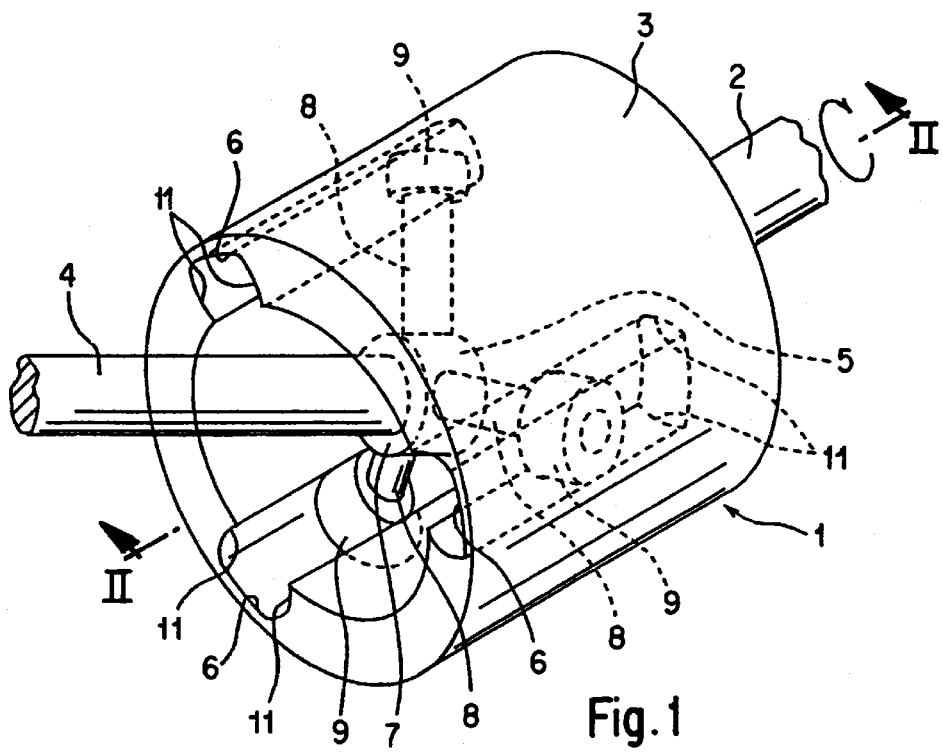
FIG. 1 is a perspective view of an example of the prior art tripod type constant velocity joint.

According to one embodiment of the present invention, a constant velocity joint of a tripod type comprises a hollow cylindrical housing to be connected to a first rotating shaft, and a tripod contained in the housing so as to be connected to a second rotating shaft. The housing has an inner peripheral surface formed with three recesses spaced apart from each other in a circumferential direction with a uniform space therebetween. Each of the recesses has an inner surface formed with a pair of guide grooves each extending axially in the housing. The tripod comprises a base portion through which the tripod is connected to the second rotating shaft, three trunnions each having a first end connected to the base portion and a second end extending to one of the recesses, and a bearing assembly mounted to the second end of each of the trunnions. The bearing assembly has a plurality of radial needle bearings provided around the second end of each of the trunnions, an inner roller provided concentric with each of the trunnions with the radial needle bearings therebetween and having a cylindrical inner peripheral face and a spherical convex outer peripheral face, so that the inner roller is rotatable around and axially movable along the trunnion, and an outer roller fitted around the inner roller and having an outer peripheral face and a spherical concave inner peripheral face. The outer peripheral face of the outer roller is received in the pair of guide grooves in the recess so that the outer roller is placed in a rolling contact relationship with the guide grooves so as to be moved only axially in the housing. The spherical concave inner peripheral face of the outer roller is engaged with the spherical convex outer peripheral face of the inner roller, so that the outer roller has a rocking relationship with the inner roller.

In the constant velocity joint mentioned above, the displacement of the inner and outer rollers in the axial direction of the housing is permitted by the rolling of the outer rollers on the guide grooves.

Next, the rocking around the tripod is permitted by the rocking of the inner rollers relative to the respective outer rollers.

Moreover, the displacement of the inner rollers and the outer rollers in the axial direction of the respective trunnions is allowed by the inner rollers which are supported on the trunnions by means of the radial needle bearings, being displaced relative to the respective trunnions.

Accordingly, the axial forces occurring with rotation of the constant velocity joint are therefore reduced, so that even when a large torque is transmitted at a large joint angle, the occurrence of uncomfortable vibrations is suppressed.

Moreover, with the tripod type constant velocity joint of the present embodiment, friction and premature peeling or flaking at the contacting portions of the constituent member pairs can be reduced.

First, the outer peripheral faces of the trunnions are in contact with the rolling faces of each of the plurality of needles. The rolling faces of the needles are mainly in rolling contact with the outer peripheral faces of the respective trunnions and hence sliding contact between the rolling faces of the needles and the outer peripheral faces of the trunnions is only slight. Due to the fact that the surface pressure is reduced while the friction is mainly rolling friction in the contact portions, then friction and premature flaking (peeling) of the contact surface pairs can be reduced.

Next, the inner peripheral faces of the respective inner rollers are contact with the respective radial needle bearings, specifically with the rolling faces of the plurality of needles. Since during transmission of the rotation force, the load is born by a plurality of needles, then the surface pressure acting between the contacting portions is not that high. Consequently, due to the low surface pressure at the contacting portions, friction and premature flaking (peeling) of the contact surface pairs can be reduced.

The outer peripheral faces in the spherical convex shape of the respective inner rollers are in contact with the inner peripheral faces in the spherical concave shape of the respective outer rollers over a wide area. Consequently, due to the resultant low surface pressure at the contacting portions, friction and premature flaking (peeling) of the contact surface pairs can be reduced.

Furthermore, the contacting portions between the outer peripheral faces of the outer rollers and the respective contact faces of the guide grooves are mainly subject to rolling friction, and while sliding friction occasionally occurs, this is minimal. And, due to the fact that the friction is mainly rolling friction, then friction and premature flaking (peeling) of the contact surface pairs can be reduced.

Figure 6:
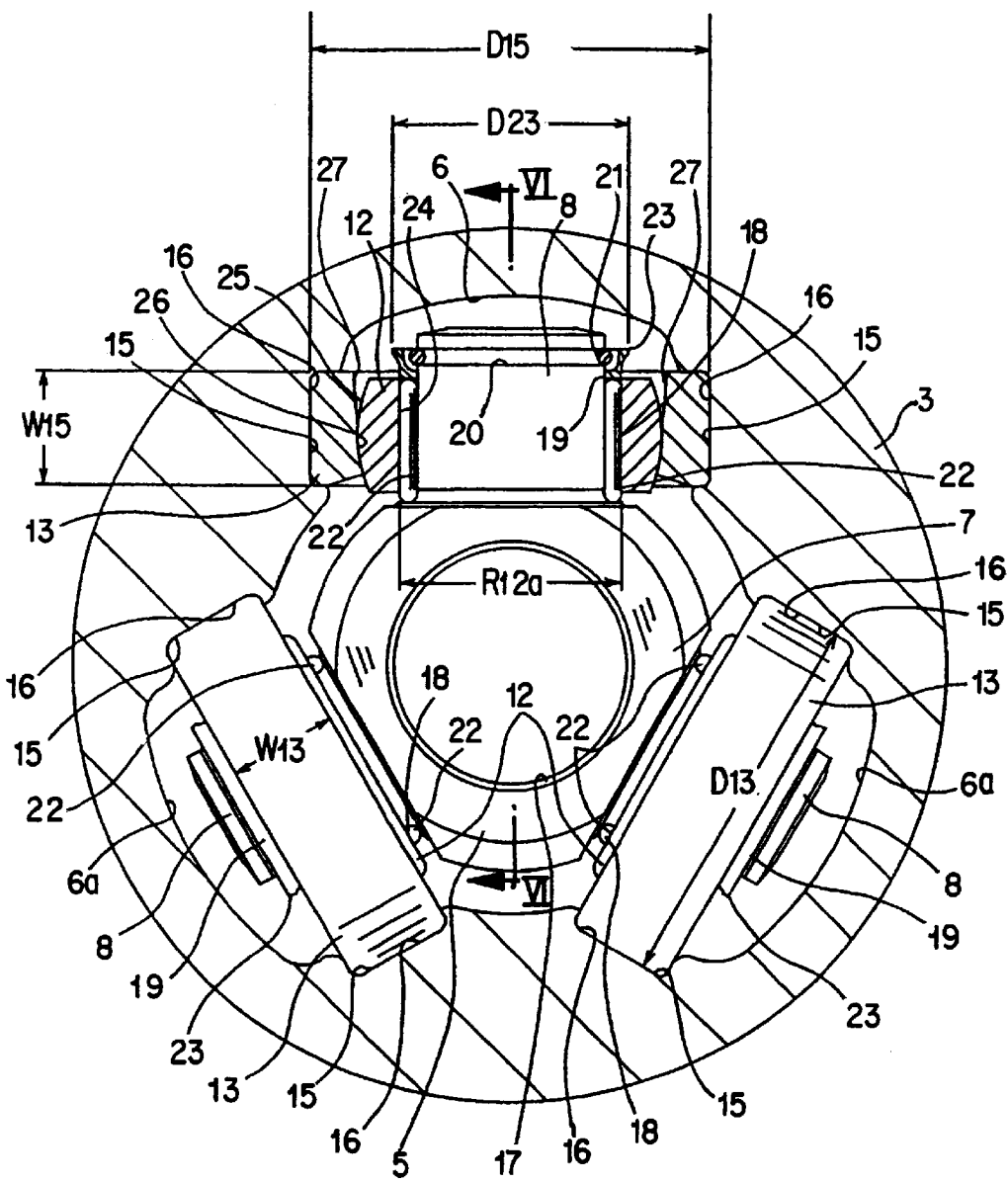
FIG. 6 is a cross sectional view of a first example of a configuration of a first embodiment of the present invention.
Figure 7:
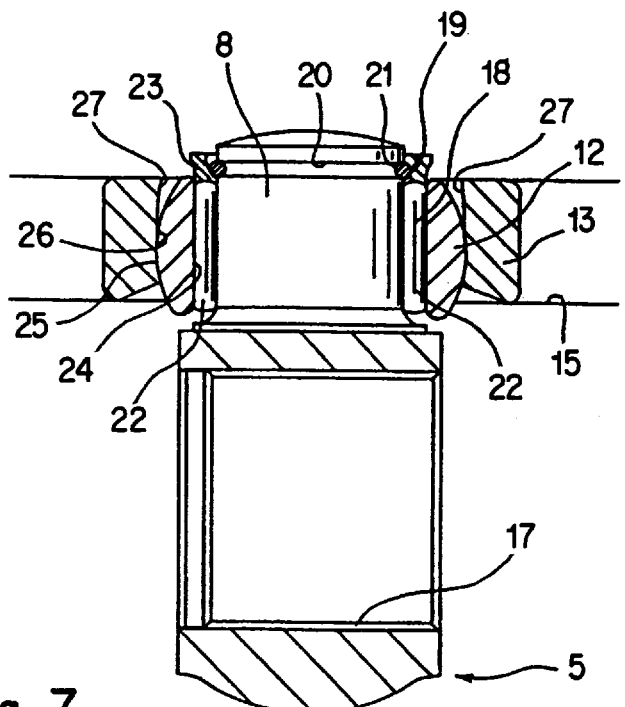
FIG. 7 is a cross sectional view taken along the line VII—VII of FIG. 6 at the joint angle of zero degrees.
Figure 8:
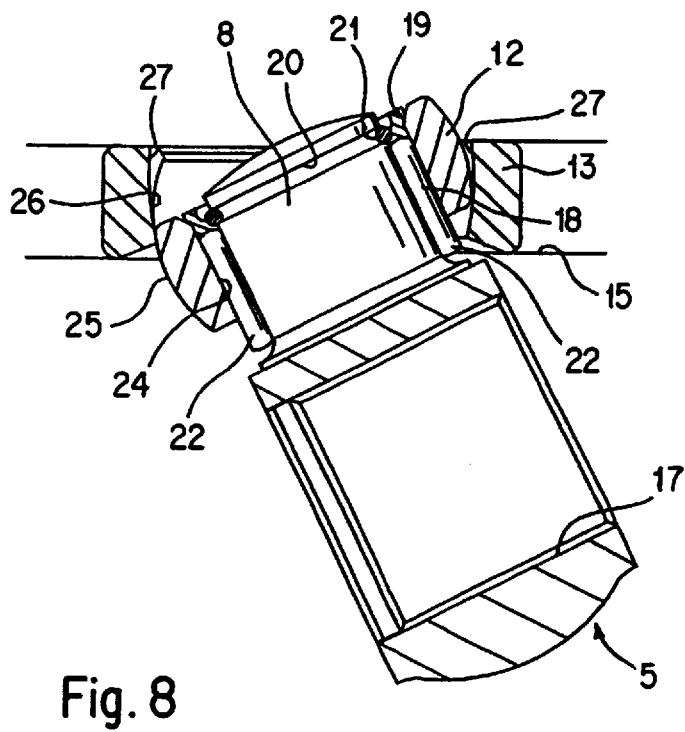
FIG. 8 is a cross sectional view of the boss and trunnion of FIG. 7 in a tilted condition at a larger joint angle.

FIGS. 6 through 8 show a first example of a configuration of an embodiment of the present invention. A hollow cylindrical housing 3 with first and second axial ends is opened at the first axial end, and fixed at a central portion of the second end (rear face side in FIG. 6) to an end of a first rotating shaft (not shown in the figures), while a tripod 5 is contained in the housing 3 and connected to an end of a second rotating shaft (not shown in the figures).

Three recesses 6a are formed on the inner peripheral face of the housing 3 at even spacing around the circumferential direction, and shaped concave outwards in the radial direction of the housing 3. A pair of guide grooves 15 for each of the recesses 6a are formed in the axial direction of the housing 3 (in the front/rear direction in FIG. 6 and the left/right direction in FIGS. 7 and 8) and defined by part of the inner face of the respective recesses 6a. That is to say, the opposite inner sides of the recesses 6a are formed as recessed grooves so as to form the respective guide grooves 15. The bottom faces 16 of the pair of guide grooves 15 in each of the recesses 6a are formed parallel with each other, while the widths W15 between the bottom faces 16 of the pairs of guide grooves 15 are made equal with each other in the three recesses 6a. The pair of guide grooves 15 can be formed in a substantially rectangular channel shape in cross section, as shown in FIG. 6.

The tripod 5 comprises a tubular base portion or boss 7 which is connected to the end of the second rotating shaft 4 (FIG. 1), and three trunnions 8 secured to the outer peripheral face of the tubular base portion or boss 7 at even spacing around the circumferential direction. The trunnions 8 fit freely inside the respective three recesses 6a. Spline grooves 17 are formed on the inner peripheral face of the boss 7, so that a large rotational force can be transmitted between the boss 7 and the second rotating shaft 4 (FIG. 1).

Respective inner rollers 12 are supported on the outer peripheral faces of the trunnions 8 by way of respective radial needle bearings 18, so as to be freely rotatable about the respective trunnions 8 and freely movable in the axial direction of the trunnions 8.

The radial needle bearings 18 are so called full type roller bearings having no retainer. It should be noted that depending on the loading conditions, needle bearings with a retainer may also be used.

Annular rotating rings 19 are externally fitted to end portions of the trunnions 8 which protrude from the radial needle bearings 18. Moreover, stop rings 21 are engaged in grooves 20 formed in the tip portions of the trunnions 8 which protrude from the base portion of the retaining rings 19. Consequently, the retaining rings 19, and the needles 22 of the radial needle bearings 18, are prevented from coming off the respective trunnions 8.

Moreover, with the example shown in the figures, formed on outer ends (the ends distant from the outer peripheral face of the boss 7) of the retaining rings 19 are stop rims 23 which are radially outward protruded. An outer diameter $D_{23}$ of the stop rims 23 is greater than an inner diameter $R_{12}$ of the inner rollers 12 ($D_{23} > R_{12}$). Consequently, the inner rollers 12 are free to move axially relative to the trunnions 8, but the axial displacement amount of the inner rollers 12 is limited by the outer peripheral faces of the bosses 7 and by the stop rims 23.

The inner peripheral faces 24 of the inner rollers 12 are formed in a cylindrical shape so as to be freely movable axially along the trunnions 8, while the outer peripheral faces 25 of the inner rollers 12 are formed in a spherical convex shape.

With this construction, outer rollers 13 are supported on the inner rollers 12 which are axially movable and rotatable around the respective trunnions 8. With this embodiment, the outer peripheral faces of the outer rollers 13 are formed as cylindrical rolling faces.

The outer peripheral faces including side face portions 40 of the outer rollers 13 are in rolling contact with the bottom faces 16 of the guide grooves 15 provided in pairs for each of the recesses 6a, so as to be freely movable only in the axial direction of the housing 3. The outer diameter $D_{13}$ of the outer rollers 13 is therefore made slightly smaller than the distance $D_{15}$ between the pair of bottom faces 16 of the guide grooves 15 ($D_{13} < D_{15}$). Moreover, the width $W_{13}$ of the outer rollers 13 is made slightly smaller than the width $W_{15}$ of the guide grooves 16 ($W_{13} < W_{15}$).

The inner peripheral faces 26 of the outer rollers 13 are formed in a spherical concave shape. The centers of curvature of the inner peripheral faces 26 in the spherical concave shape are located on the respective central axes of the outer rollers 13, so that the inner peripheral faces 26 in the spherical concave shape and the outer peripheral faces 25 in the spherical convex shape are able to pivot freely relative to each other. The outer rollers 13 are thus externally engaged with the outside of the inner rollers 12 so as to pivot freely thereabout due to this engagement of the inner peripheral faces 26 in the spherical concave shape with the outer peripheral faces 25 in the spherical convex shape.

At two diametrically opposite locations on the inner peripheral faces of each of the outer rollers 13, there is formed insertion grooves 27 for fitting of the inner rollers 12 inside the outer rollers 13. These insertion grooves 27 are known for example from the disclosure of the Japanese Unexamined Utility Model Publication KOKAI No. 5-67821. Since these are not essential to the present invention, detailed description is omitted.

The tripod type contact velocity joint of the present embodiment constructed as described above, effects transmission of a rotational force at constant velocity between the first rotation shaft 2 secured to the housing 3 and the second rotation shaft 4 connected to the tripod 5, in a similar manner to the beforementioned conventional construction. However, with the tripod type constant velocity joint of the present embodiment, since this operates in the following manner, it is possible to suppress the occurrence of uncomfortable vibrations or oscillations without causing a reduction in life.

More specifically, when a rotational force is transmitted with a joint angle between the first rotation shaft 2 and the second rotation shaft 4 where the rotation shafts 2, 4 are not aligned with each other, the trunnions 8 of tripod 5 move in a complex manner (in three directions) relative to the recesses 6a or guide grooves 15 of the housing 3. With the tripod type constant velocity joint of the present invention, this multiple direction displacement is permitted to occur smoothly, and hence the occurrence of axial forces which cause vibration is prevented.

First, regarding the displacement of the trunnions 8 relative to the recesses 6a in the axial direction of the housing 3, this is permitted by the rolling of the outer rollers 13 on the respective guide grooves 15. During this rolling movement, the inner rollers 12 also rotate together with the respective outer rollers 13. This rotation is permitted by the radial needle bearings 18.

Next, regarding the displacement of the tripod 5 relative to the recesses 6 or guide faces 15 in the rocking direction about the center of the boss 7 as shown in FIG. 8, this permitted by the inner rollers 12 rocking relative to the respective outer rollers 13.

Moreover, with the rocking of the trunnions 8 together with the displacement of the outer rollers 13 along the guide grooves 15 in the axial direction of the housing 3 as mentioned above, there is the requirement for the trunnions 8 to move in their axial direction relative to the respective recesses 6a. Such displacement is compensated for by the displacement of the inner rollers 12 and the other rollers 13 in the axial direction of the respective trunnions 8 as shown in FIG. 8. That is to say, such a displacement is allowed by the inner rollers 12 which are supported on the trunnions 8 by means of the radial needle bearings 18, being displaced relative to the respective trunnions 8.

With the tripod type constant velocity joint of the present embodiment, the relative displacements of the peripheral face of outer rollers 13 relative to the peripheral face of inner rollers 12 are simple and are carried out stably. The axial forces occurring with rotation of the constant velocity joint are therefore reduced, so that even when a large torque is transmitted at a large joint angle, the occurrence of uncomfortable vibrations is suppressed.

Moreover, with the tripod type constant velocity joint of the present embodiment, friction and premature peeling or flaking at the contacting portions of the constituent member pairs can be reduced. First, the outer peripheral faces of the trunnions 8 are in contact with the respective radial needle bearings 18, specifically with the rolling faces of each of the plurality of needles 22. Consequently, a sufficient overall contact face area is ensured to thus limit the surface pressure at the contacting portions. The rolling faces of the needles 22 are mainly in rolling contact with the outer peripheral faces of the respective trunnions 8. Moreover as a general rule, the radial needle bearings 18 are not displaced in the axial direction of the respective trunnions 8, and hence sliding contact between the rolling faces of the needles 22 and the outer peripheral faces of the trunnions 8 is only slight. As a result, due to the reduction in contact pressure between the contacting portions on the outer peripheral faces of the respective trunnions 8 and the rolling faces of the needles 22, and due to the fact that the friction is mainly rolling friction, then friction and premature flaking (peeling) of the contact surface pairs can be reduced.

Next, the inner peripheral faces 24 in the cylindrical shape of the respective inner rollers 12 are contact with the respective radial needle bearings 18, specifically with the rolling faces of the plurality of needles 22. Since during transmission of the rotation force, the load is born by a plurality of needles 22, then the surface pressure acting between the cylindrical surfaces 24 and the rolling faces of the needles 22 is not that high. Consequently, due to the low surface pressure at the contacting portions, friction and premature flaking (peeling) of the contact surface pairs can be reduced.

The outer peripheral faces 25 in the spherical convex shape of the respective inner rollers 12 are in contact with the inner peripheral faces 26 in the spherical concave shape of the respective outer rollers 13 over a wide area. Consequently, due to the resultant low surface pressure at the contacting portions, friction and premature flaking (peeling) of the contact surface pairs can be reduced.

Furthermore, the contacting portions between the outer peripheral faces of the outer rollers 13 and the respective bottom faces 16 are mainly subject to rolling friction, and while sliding friction occasionally occurs, this is minimal. Furthermore, since the radius of curvature of the outer peripheral faces of the outer rollers 13 is large, then the contact face area of the contacting portions is comparatively large. Consequently, due to the resultant low surface pressure at the contacting portions, and due to the fact that the friction is mainly rolling friction, then friction and premature flaking (peeling) of the contact surface pairs can be reduced.

Figure 9:
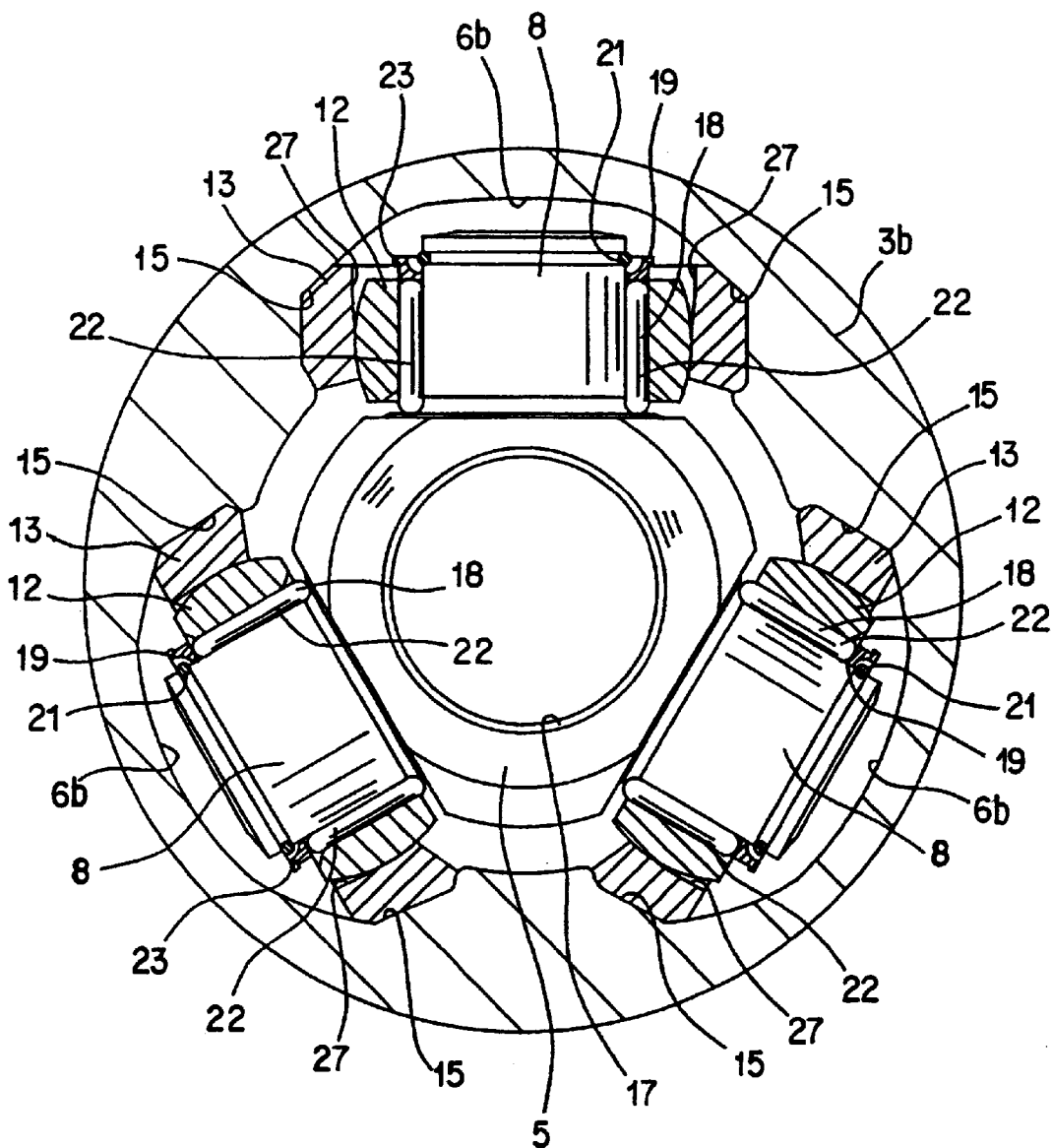
FIG. 9 is a cross sectional view of a second example of a configuration of the first embodiment of the present invention.

FIG. 9 shows a second example of a configuration of the first embodiment of the present invention. With this example, the manufacturing operation for a housing 3 is simplified by changing the shape of recesses 6b formed on the inner peripheral face of the housing 3. To match this, the shape of the outer peripheral faces of outer rollers 13 is also changed so as to accurately contact with guide grooves 15 formed on the inside of the respective concave portions or recesses 6b. Other details of construction and operation are substantially the same as for the abovementioned first example.

Figure 10:
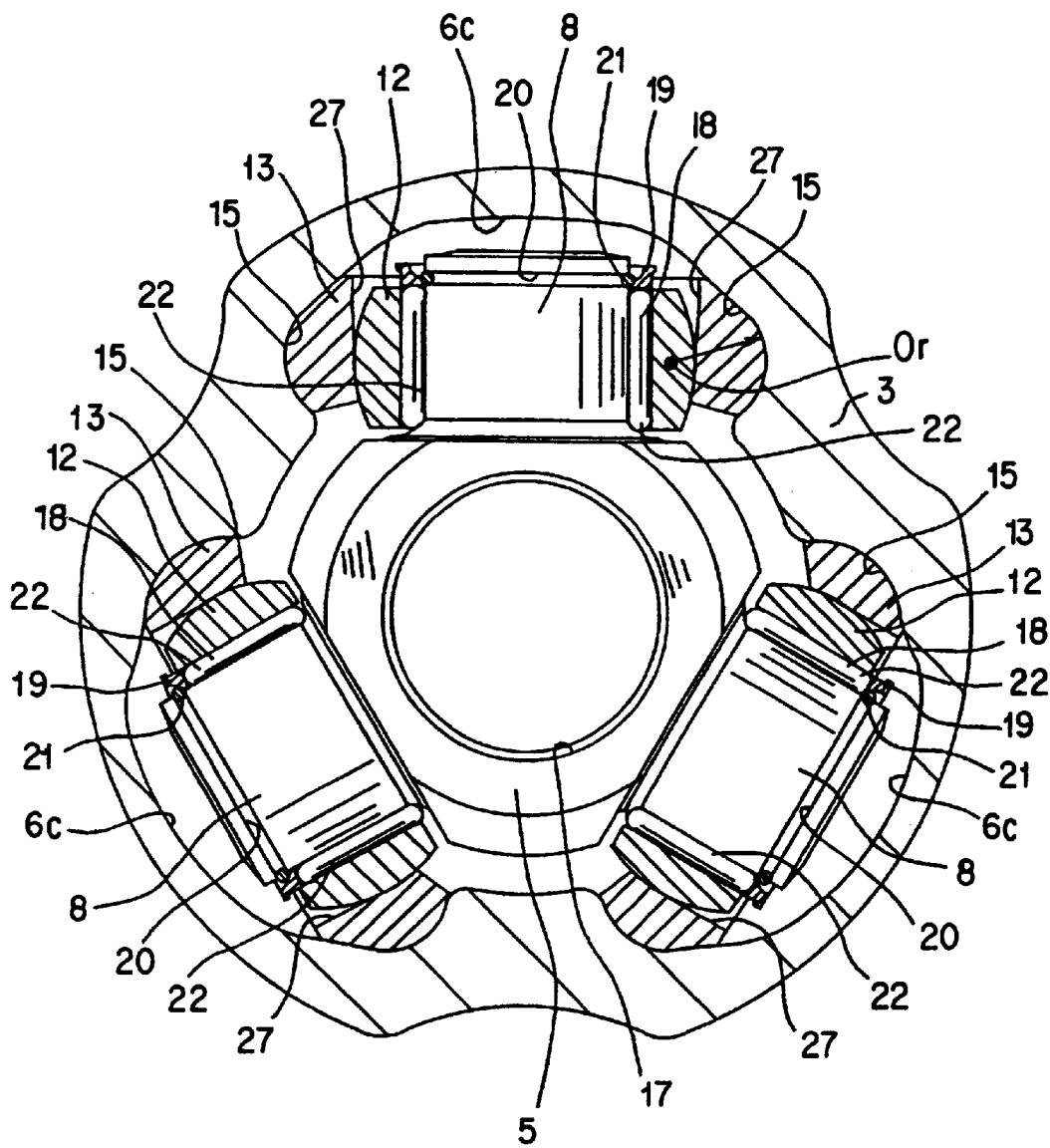
FIG. 10 is a cross sectional view of a third example of a configuration of the first embodiment of the present invention.

FIG. 10 shows a third example of a configuration of the first embodiment according to the present invention. With this example, the outer peripheral faces of outer rollers 13, and the guide grooves 15 which guide the outer peripheral faces of outer rollers 13 are made arcuate in cross sectional shape, with a center point Or of the radius of curvature of the arcuate shape located between a central axis of respective trunnions 8 and the inner peripheral faces of the respective outer rollers 13. By adopting such a shape, then the respective outer rollers 13 can be positively guided in the axial direction (from front to rear in FIG. 10) of a housing 3.

Moreover, the housing 3 can be lightened by recessing a portion of the outer peripheral face of the housing 3 radially inwards. Other details of construction and operation are the same as for the abovementioned first example.

With the tripod type constant velocity joint according to the embodiments in the present invention constructed and operated as described above, since uncomfortable vibrations do not occur, and a substantial life can be obtained, it is possible to realize both an improvement in the comfort of vehicles fitted with a tripod type constant velocity joint, and an extension in component replacement periods.

In the case of the tripod type constant velocity joint according to the first embodiment constructed as described above, the frictional resistance due to the sliding contact between the outer faces of the respective outer rollers 13 and the inner faces of the guide grooves 15 is variable so that transmission efficiency must be still improved by making the friction resistance stable. This will be explained with reference to FIGS. 11 through 16.

Figure 2:
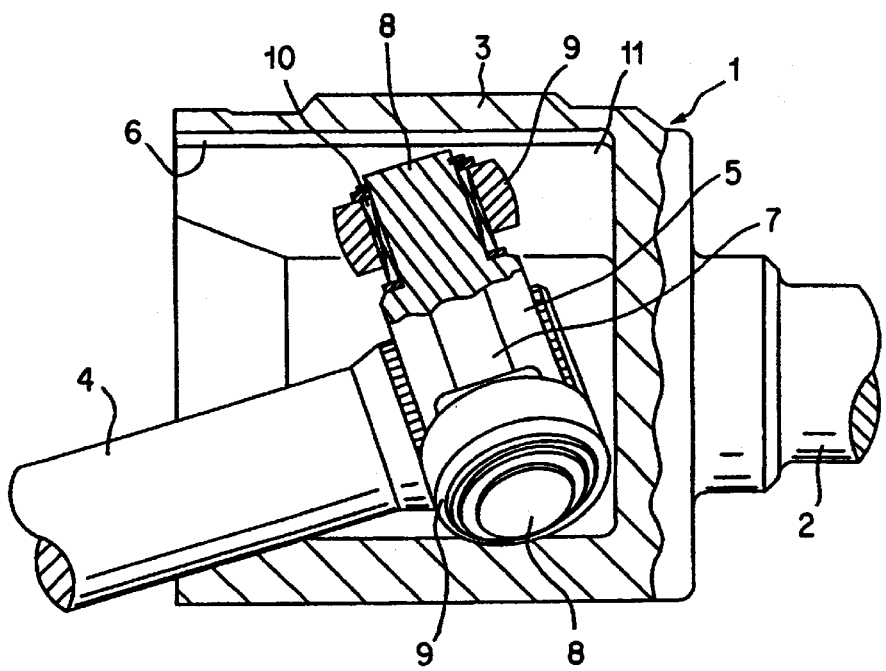
FIG. 2 is a cross sectional view taken along the line II—II of FIG. 1.

When a rotational force is transmitted between the first rotating shaft 2 and the second rotating shaft 4 with their axes out of alignment as shown in FIGS. 1 and 2, then the three trunnions 8 of the tripod 5 swing back and forth about the boss 7.

On the other hand, the respective outer rollers 13 move back and forth only in the axial direction of the housing 3 (to the left and right directions in FIGS. 11 and 12) along the guide grooves 15. As a result, a force in a direction perpendicular to the guide grooves 15 is applied to the respective outer rollers 13.

Figure 11:
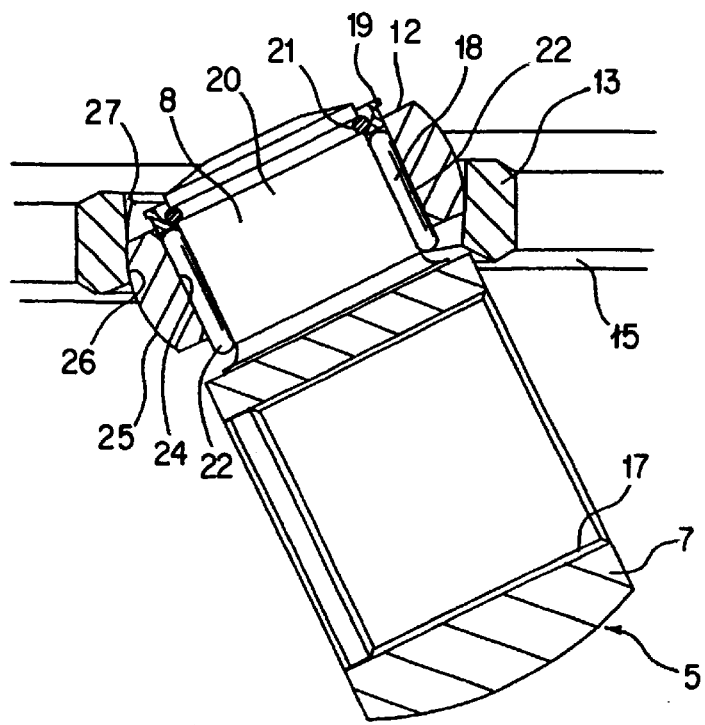
FIG. 11 is a cross sectional view similar to FIG. 8.
Figure 12:
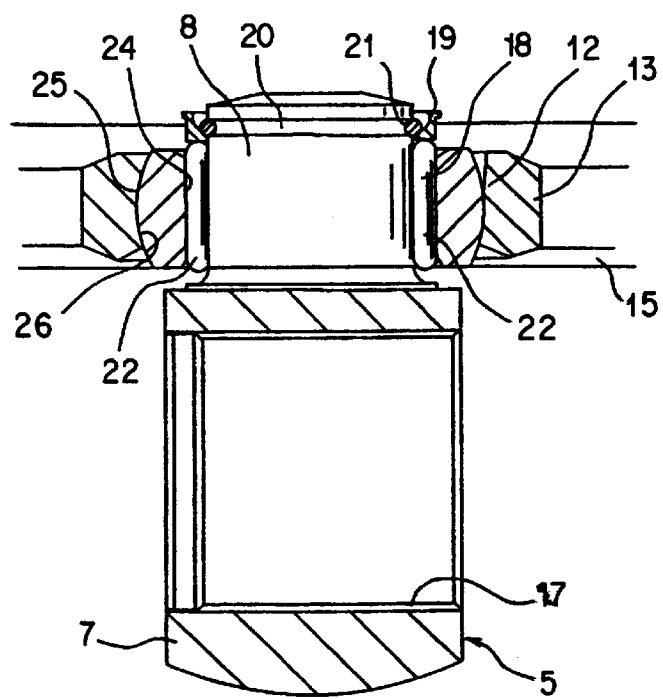
FIG. 12 is a cross sectional view similar to FIG. 7.

For example, when the trunnion 8 is displaced from the condition of FIG. 11 to the condition of FIG. 12, then a force in the pushing direction (upward direction in FIGS. 11 and 12) is applied to the outer rollers 13, so that the outer side face of the outer roller 13 is pressed against the side wall of the guide groove 15 at the radially outer side of the housing (the face portion of the outer roller 13 farthest from the boss 7; the upper face in FIGS. 11 and 12).

On the other hand, when the trunnion 8 is displaced from the condition of FIG. 12 to the condition of FIG. 11, then a force in the pulling direction (downward direction in FIGS. 11 and 12) is applied to the outer roller 13, so that the side face on the inner periphery side of the outer roller 13, is pressed against the side wall of the guide groove 15 at the radially inner side of the housing (the face portion on the side of boss 7; the lower face in FIGS. 11 and 12).

On the other hand, in the case of the construction of the first embodiment, since the widths $W_{15}$ (refer to FIG. 6) of the guide grooves 15 formed as respective pairs for each of the recesses 6a on the inner surface of the housing 3 are made equal to each other, then the contact condition between the outer surfaces of the outer rollers 13 and the inner surfaces of the guide grooves 15 is not always constant. That is to say, when transmission of a rotational force is carried out between the first rotating shaft 2 and the second rotating shaft 4, then the outer peripheral face of the respective outer rollers 13 presses against the bottom face 16 of one of the guide grooves 15 (the lower one in FIGS. 13 to 16) which are formed as pairs for each of the recesses 6a. A small gap is formed between the bottom face 16 of the other of the guide grooves 15 (the upper one in FIGS. 13 to 16) and the outer peripheral face of the respective outer rollers 13.

If the positional relation between the guide grooves 15 formed as pairs for each of recesses 6a and the outer rollers 13 which span between the pairs of guide grooves 15, is the same, no problem would be caused.

Figure 15:
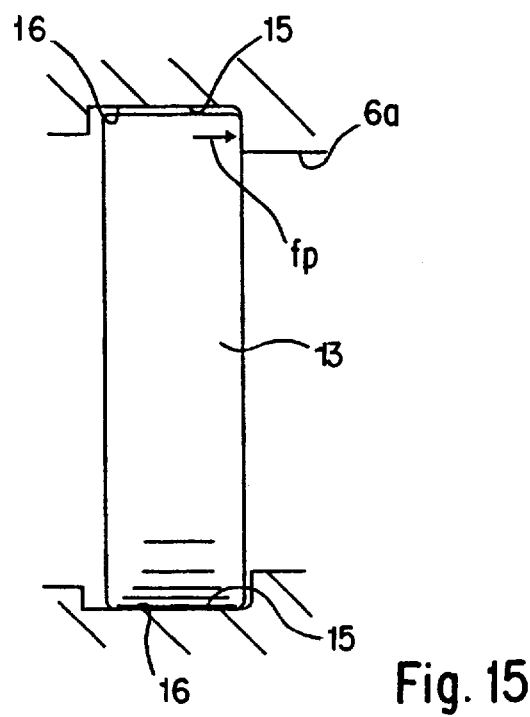
FIG. 15 is a schematic view showing the relation between the side face of the outer ring and the side wall of the guide groove.

However there are often cases where this positional relationship differs due to unavoidable manufacturing errors. Therefore, when the rotation force is being transmitted, the side face at the outer peripheral portion of the outer roller 13 as shown in FIG. 13, contacts with the side wall of the guide groove 15 at the anchor side (the side for transmission of the rotational force) where the outer peripheral face of the outer roller 13 and the bottom face 16 of the guide groove 15 are in contact with each other, or on the contrary, as shown in FIG. 15, at the non anchor side (the side which does not transmit the rotational force) where the outer peripheral face of the outer roller 13 and the bottom face 16 of the guide groove 15 are not contact with each other), the side face at the outer peripheral portion of the outer roller 13 contacts with the side wall of the guide groove 15.

Hence in either case, a friction force $f_m$ acts at the contact point $O_m$, and this friction force becomes a source of resistance to the rotation of the outer rollers 13. This friction force $f_m$ is represented by $f_m = f_p - \mu$ where fp is the force with which the side face of the outer roller 13 is pressed against the side face of the guide groove 15, and $\mu$ is the friction coefficient between these surfaces.

Moreover, the friction reaction force $f_1$ (in the case of FIGS. 13, 14) or $f_2$ (in the case of FIGS. 15, 16) in the displacement direction (to the right in FIGS. 14 and 16) of the outer roller 13 acts on the outer roller 13 as a force opposing this friction force $f_m$ with a moment centered on a contact point $O_p$ of the outer peripheral face of the respective outer rollers 13 and the bottom face 16. These friction reaction forces, $f_1$, $f_2$ resist the rotation of the respective outer rollers 13. Of these respective friction reaction forces $f_1$, $f_2$, the friction reaction force $f_1$ for the case where the side face of the outer rollers 13 as shown in FIG. 13 rubs against the side wall of the guide grooves 15 on the anchor side, is obtained as follows.

The distance between the contact points $O_m$, $O_p$ in the radial direction of the outer rollers 13 is $L_1$, while the radius of the outer rollers 13, being the distance from the contact point $O_p$ to the point where the friction force $f_1$ acts, is r.

At first, the moment about the contact point $O_p$ due to the friction force $f_m$ is $f_m \cdot L_1$. On the other hand the moment about the contact point $O_p$ due to the friction reaction force $f_1$ is $f_1 \cdot r$. Since these moments are of the same magnitude and in opposite directions, then $f_m \cdot L_1 = f_1 \cdot r$. Consequently, the friction reaction force $f_1$ for when the side face of the outer rollers 13 rub against the side wall of the guide grooves 15 at the anchor side is given by the following equation (1).

$$f_1 = f_m \cdot L_1 / r \qquad (1)$$

Furthermore, as shown in FIG. 15, the friction reaction force $f_2$ for when the side face of the outer roller 13 rubs against the side wall of the guide groove 15 at the non anchor side, is similarly obtained from the following equation (2). In this case, the distance between the contact points $O_m$, $O_p$ in the radial direction of the outer roller 13 is $L_2$.

$$f_2 = f_m \cdot L_2 / r \qquad (2)$$

Figure 16:
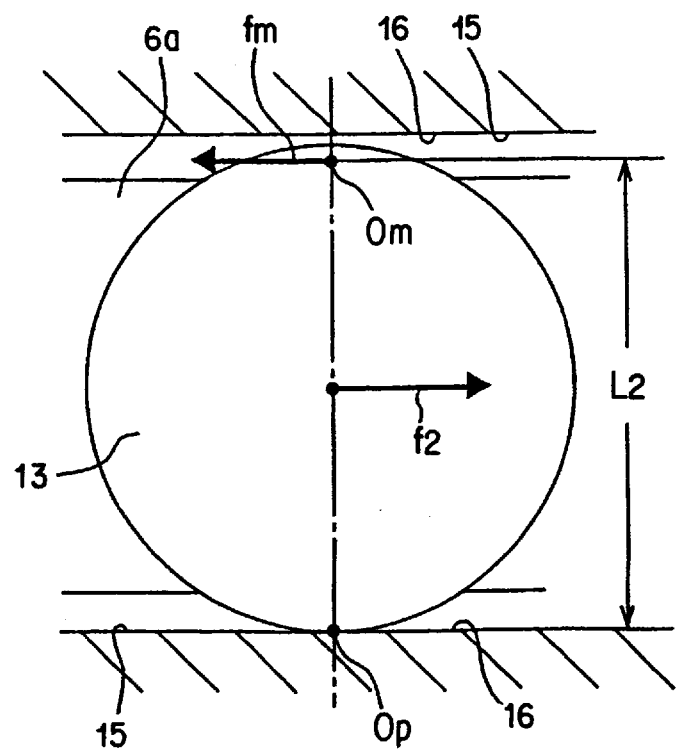
FIG. 16 is a schematic view looked from right in FIG. 13.

As is clear from a comparison of FIG. 14 and FIG. 16, $L_1 \ll L_2$, and $f_1 \ll f_2$. Consequently, in order to reduce the power loss due to the friction between the side face of the outer rollers 13 and the side wall of the guide grooves 15 so as to improve the transmission efficiency of the tripod type constant velocity joint under joint angle conditions, then it is desirable to have a sliding contact between the side face of the outer rollers 13 and the side wall of the guide grooves 15 at the anchor side as shown in FIG. 13.

In the case of the construction of beforementioned first embodiment, since the width $W_{15}$ of the guide grooves 15 formed as pairs for each of the inner surfaces of the housing 3 are equal to each other, then the contact condition between the side face of the outer rollers 13 and the side wall of the guide grooves 15 is not always constant. In other words, since a construction has not been positively adopted so that the side face of the outer rollers 13 and the side wall of the guide grooves 15 come in sliding contact with each other at the anchor side, then the situation arises where the side face rubs against the side wall even at the non anchor side. This is to say, the direction in which the respective outer rollers 13 are pushed in the axial direction of the trunnions 8 differs if the swing direction of the trunnions 8 changes. Consequently, in the case of the conventional construction and the construction of the first embodiment, even if at some time of period the side faces of the outer rollers 13 and the side walls of the guide grooves 15 are in sliding contact with each other at the anchor side as shown in FIGS. 13 and 14, then at some other time of period as shown in FIGS. 15 and 16, the side face may rub the side wall at the non anchor side.

Therefore, at the time of transmission of a rotational force between the first rotating shaft 2 and the second rotating shaft 4 under joint angle conditions, the drive losses due to friction generated at the inner parts of the tripod type constant velocity joint are great.

The tripod type constant velocity joint of the present embodiment has been developed in view of the above situation, with the object of reducing the drive losses due to friction generated at the inner parts of the tripod type constant velocity joint.

According to the present embodiment of the invention, a constant velocity joint of a tripod type comprises a hollow cylindrical housing to be connected to a first rotating shaft, and a tripod contained in the housing so as to be connected to a second rotating shaft. The housing has an inner peripheral surface formed with three recesses spaced apart from each other in a circumferential direction with a uniform space therebetween. Each of the recesses has an inner surface formed with first and second guide grooves opposed to each other and extending axially in the housing. The tripod comprises a base portion through which the tripod is connected to the second rotating shaft, three trunnions each having a first end connected to the base portion and a second end extending to one of the recesses, and a bearing assembly mounted to the second end of each of the trunnions. The bearing assembly has an inner roller provided concentric with each of the trunnions, so that the inner roller is rotatable around, and an outer roller fitted around the inner roller and having an outer peripheral face received in the pair of guide grooves in the recess so that the outer roller is placed in a rolling contact relationship with the guide grooves so as to be moved only axially in the housing, so that the outer roller has a rocking relationship with the inner roller.

The first and second guide grooves are formed such that the outer peripheral face of the outer roller is pressed on the first guide groove and not pressed on the second guide groove when rotating force is transmitted through the first and second rotating shafts, so that there is a clearance generally between the outer peripheral face of the outer roller and the second guide groove while the trunnions are rocking, whereby the outer roller is prevented from coming in a sliding contact with the second guide groove during rocking of the trunnion.

Incidentally, in the case of the tripod type constant velocity joint which is incorporated in the automobile drive system, the rotation is reversed in direction between forwarding and backwarding, so that the side where the outer peripheral face of the outer roller is not pressed during transmission of rotating forces changes. However, in the case of automobiles, the forwarding conditions are experienced much more than the backwarding conditions, and the rotating forces transmitted upon forwarding are generally larger than those transmitted upon backwarding.

Accordingly, the side where the outer peripheral face of the outer roller is not pressed during transmission of the rotating force, is designated in the condition of forwarding. In addition, in order to provide that side with a gap generally between the opposed outer and inner faces, the guide groove formed on the side where the peripheral face of the outer roller is not pressed during transmission of the rotating force must be larger in width than the guide groove on the side where the outer peripheral face of the outer roller is pressed during transmission of the rotating force.

With the tripod type constant velocity joint constructed as described above, then the inner surfaces of the guide grooves on the side which is not pressed by the outer peripheral surfaces of the outer rollers, are not placed in sliding contact with the outer faces of the outer rollers over the whole range of swing of the respective trunnions. In other words, the inner faces of the guide grooves on the side which is pressed by the outer peripheral faces of the outer rollers are placed in sliding contact with the outer faces of the outer rollers. Therefore, the drive losses due to friction generated at the inner parts of the tripod type constant velocity joint are reduced, so that the transmission efficiency of the tripod type constant velocity joint is increased.

Figure 17:
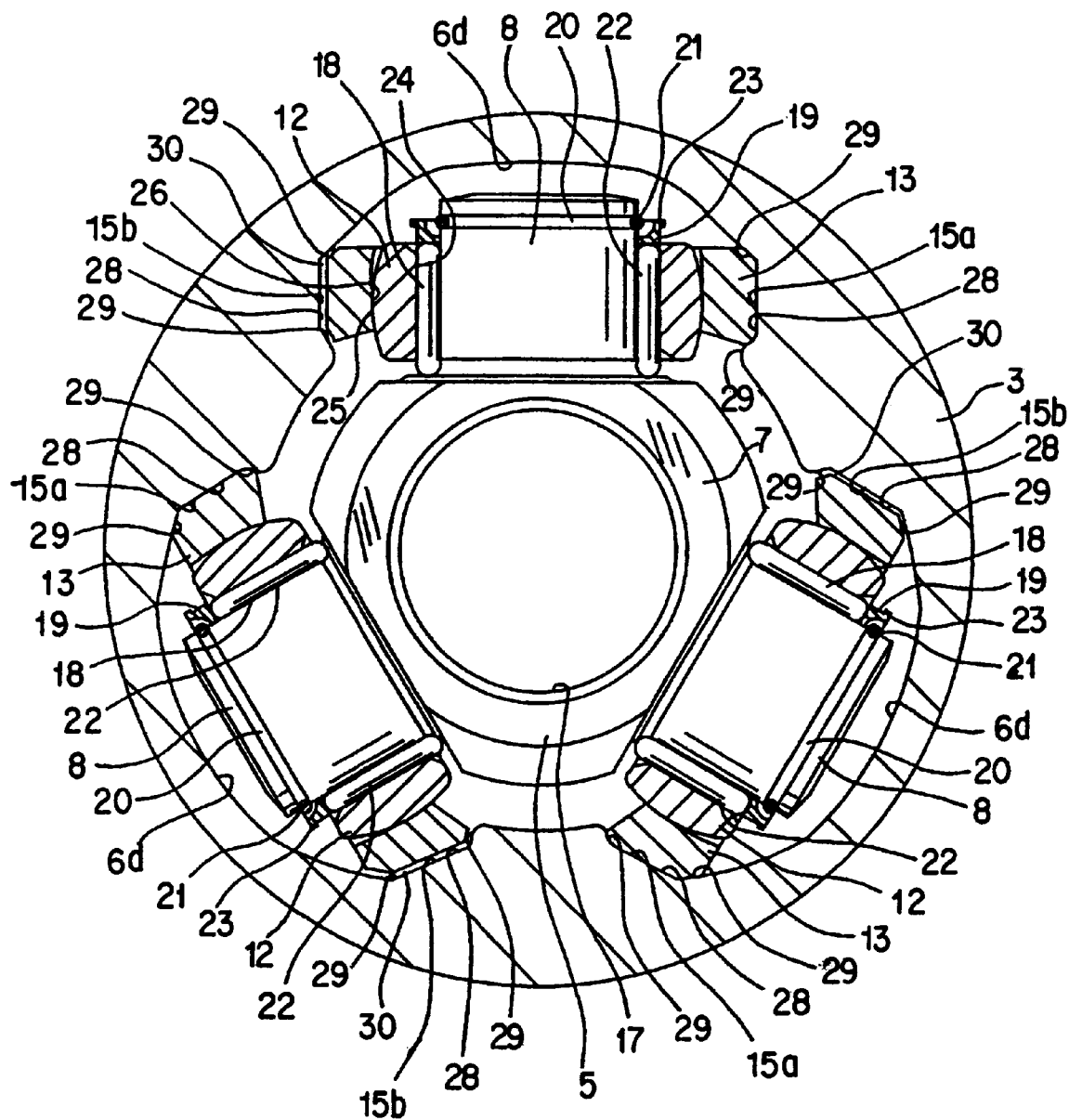
FIG. 17 is a cross sectional view of a first example of a second embodiment of the present invention.

FIG. 17 shows a first example of a second embodiment of the present invention. The characteristic of the present embodiment is in the construction for reducing the friction losses at the inner parts of the tripod type constant velocity joint at the time of transmitting a rotational force under joint angle conditions.

In the case of this embodiment, the construction and operation of other parts are substantially the same as for the construction of the first embodiment shown in FIGS. 6 through 10, and hence illustration and description related to similar components is either omitted or abbreviated, with the following description focusing on the characteristic parts of the second embodiment.

With the structure of this embodiment incorporated into a drive system of an automobile, then when the automobile moves forward, the housing 3 and the tripod 5 rotate in the counter clockwise direction in FIG. 17.

Recesses 6a are formed at three locations on the inner peripheral face of the housing 3 at even circumferential spacing, with guide grooves 15a, 15b provided in pairs for each of the recesses 6d. The guide groove 15a is positioned on the leading side in the rotation direction to press on the outer peripheral face of the respective outer rollers 13 at the time of transmission of a rotational force when the automobile is moved forward, while the guide groove 15b is positioned on the tailing side in the rotation direction, which do not press on the outer peripheral face of the respective outer rollers 13 at the time of transmission of a rotational force when the automobile is moved forward.

The respective guide grooves 15a, 15b are formed as semi-trapezoid shape in cross-section by forming planar portions 28 at the widthwise central portion and inclined portions 29 on opposite sides of the planar portions 28, with the width increasing towards the opening.

With these respective guide grooves 15a, 15b, the cross-sectional shape and size of the guide grooves 15a is made so as to give engagement with the cross-sectional size and shape of the portion near the outer diameter of the respective outer rollers 13 via a very small gap. Consequently, not only does the outer peripheral face of the respective outer rollers 13 contact the planar portion 28 of the guide grooves 15a on the leading side in the rotation direction without any gap in the radial direction, but it also faces the respective inclined portions 29 in the widthwise direction, with a gapless contact or a very small gap.

Also, the cross-sectional size of the guide grooves 15b is made slightly greater than the cross-sectional size of the portion near the outer diameter of the respective outer rollers 13. More specifically, the width of the planar portions 28 of the respective guide grooves 15b is made slightly greater than the width of the planar portion 28 of the respective guide grooves 15a. In the this way, the direction in which the width of the planar portions 28 of the guide grooves 15b is greater than the width of the planar portions 28 of the guide grooves 15a is spread inward and outward in the radial direction of the housing 3.

Consequently, under conditions where the outer peripheral face of the respective outer rollers 13 are in gapless contact with the planar portions 28 and the inclined portions 29 of the guide groves 15a on the leading side in the rotation direction, then gaps 30 exist between the outer peripheral faces of the respective outer rollers 13 and the guide grooves 15b on the tailing side in the rotation direction. These respective gaps 30 are formed spanning the full width between the outer peripheral faces of the respective outer rollers 13 and the guide grooves 15b on the tailing side in the rotation direction.

Consequently, at the time of transmission of a rotational force when the automobile is moved forward, the inner surfaces of the guide grooves 15b on the side which is not pressed by the outer peripheral faces of the respective outer rollers 13, are not placed in sliding contact with the outer surfaces of the respective outer rollers 13 over the whole range of swing of the trunnions 8.

With the tripod type constant velocity joint constructed as described above, then the inner surfaces of the guide grooves 15b on the tailing side which is not pressed by the outer peripheral surfaces of the respective outer rollers 13, are not placed in sliding contact with the outer faces of the respective outer rollers 13 over the whole range of swing of the respective trunnions 8. In other words, the inner faces of the guide grooves 15b on the leading side which is pressed by the outer peripheral faces of the respective outer rollers 13 are placed in sliding contact with the outer faces of the respective outer rollers 13. Therefore, the drive losses due to friction generated at the inner parts of the tripod type constant velocity joint are reduced, so that the transmission efficiency of the tripod type constant velocity joint is increased.

In the case of this embodiment, even if the guide grooves 15a on the leading side in the rotation direction are made the same in size and shape to the guide grooves 15b on the tailing side in the rotation direction (the widths of the planar portions 28 are made the same), the inner surfaces of the guide grooves 15b on the side which is not pressed by the outer peripheral surfaces of the respective outer rollers 13 can be made so as not to rub against the respective outer rollers 13. That is to say, with these respective guide grooves 15b, there are inclined portions 29 on opposite side in the widthwise direction such that the width increases towards the opening of the respective guide grooves 15b. Therefore, at the time of transmitting a rotation force, a gap is formed in the thrust direction as well as the radial direction between the outer peripheral faces of the respective outer rollers 13 and the respective guide grooves 15b. Therefore in this case, units having the same shape may be used for the housing 3 for tripod type constant velocity joints provided on the left and right of an automobile, so that commonalization of components is thus possible.

Figure 18:
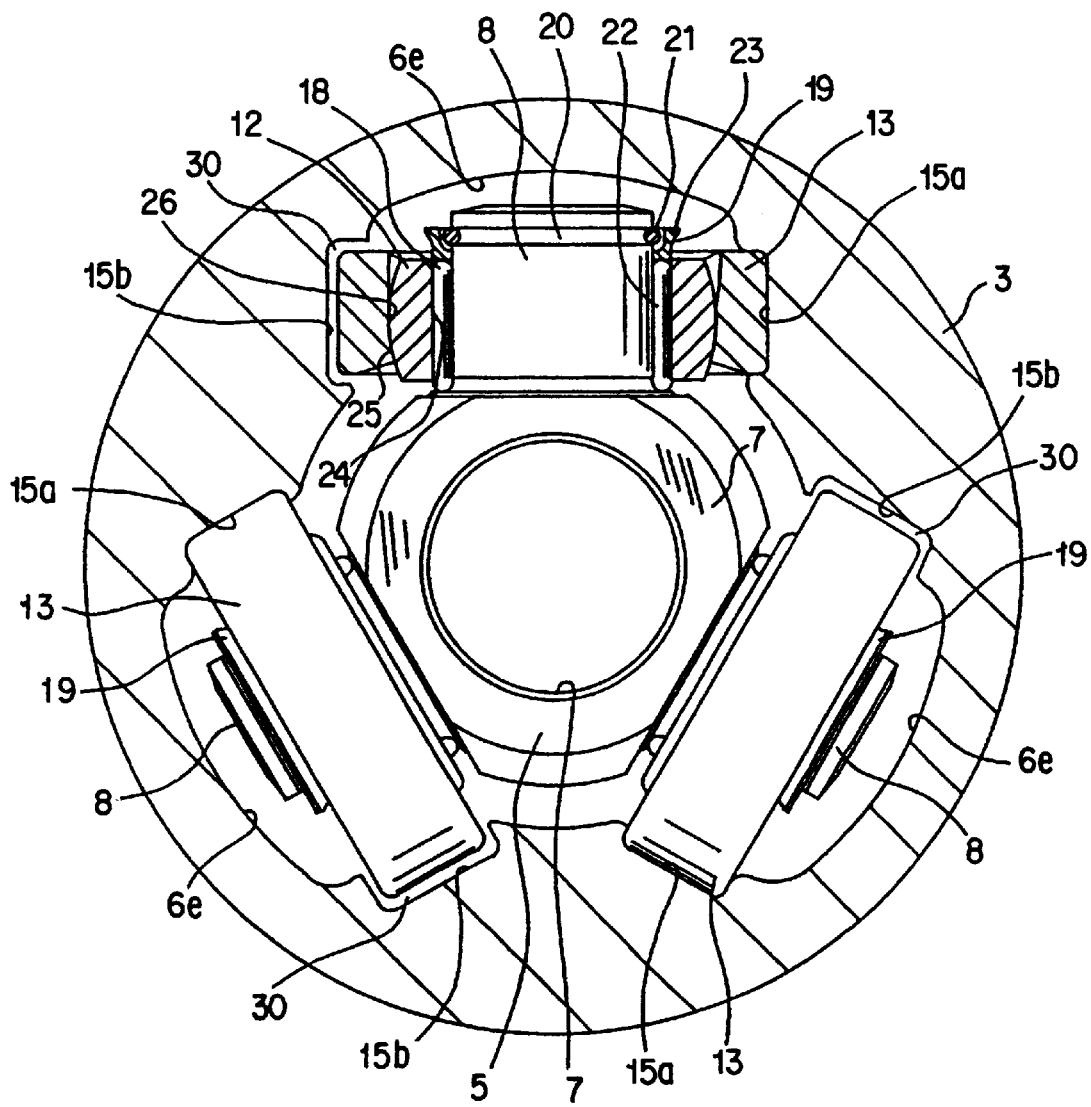
FIG. 18 is a cross sectional view of a second example of the second embodiment of the present invention.

FIG. 18 shows another example of the second embodiment of the present invention. With this embodiment, the guide grooves 15a and 15b provided in pairs for each of the respective recesses 6e formed at three locations on the inner peripheral face of the housing 3 at even circumferential spacing, and the shape of the guide grooves 15a and 15b is rectangular shape. Consequently, the mutually opposed inner faces of the respective guide grooves 15a 15b are planar and parallel with each other. In the case of this example with guide grooves 15a, 15b of this shape, then the width of the guide grooves 15b on the tailing side in the rotation direction is made greater than the width of the guide grooves 15a on the leading side in the rotation direction. The construction and the operation is substantially same as for the case of the first example except for the point that the sectional shapes of the guide grooves differ.

Figure 3:
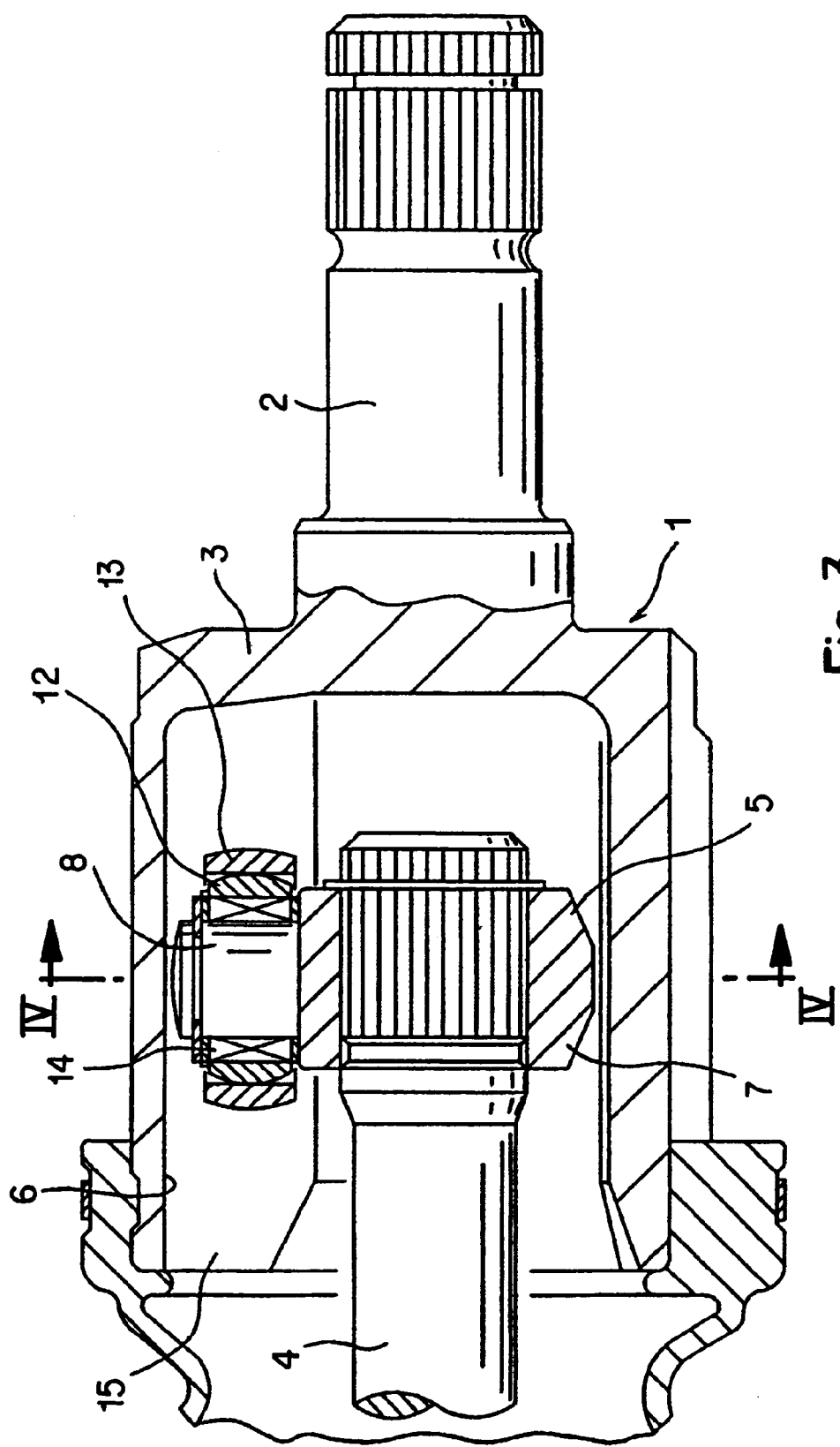
FIG. 3 is a cross sectional view of another example of the prior tripod type constant velocity joint.
Figure 4:
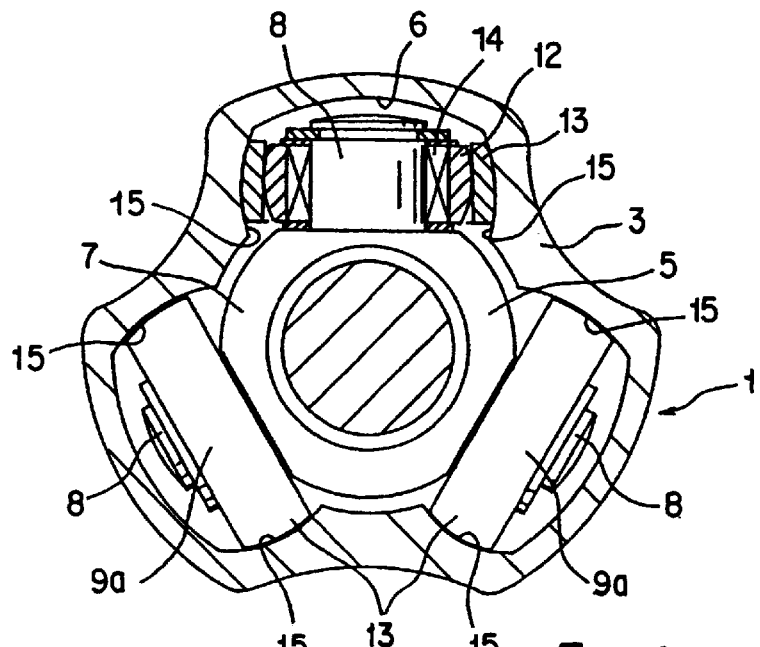
FIG. 4 is a cross sectional view taken along the line IV—IV of FIG. 3.
Figure 5:
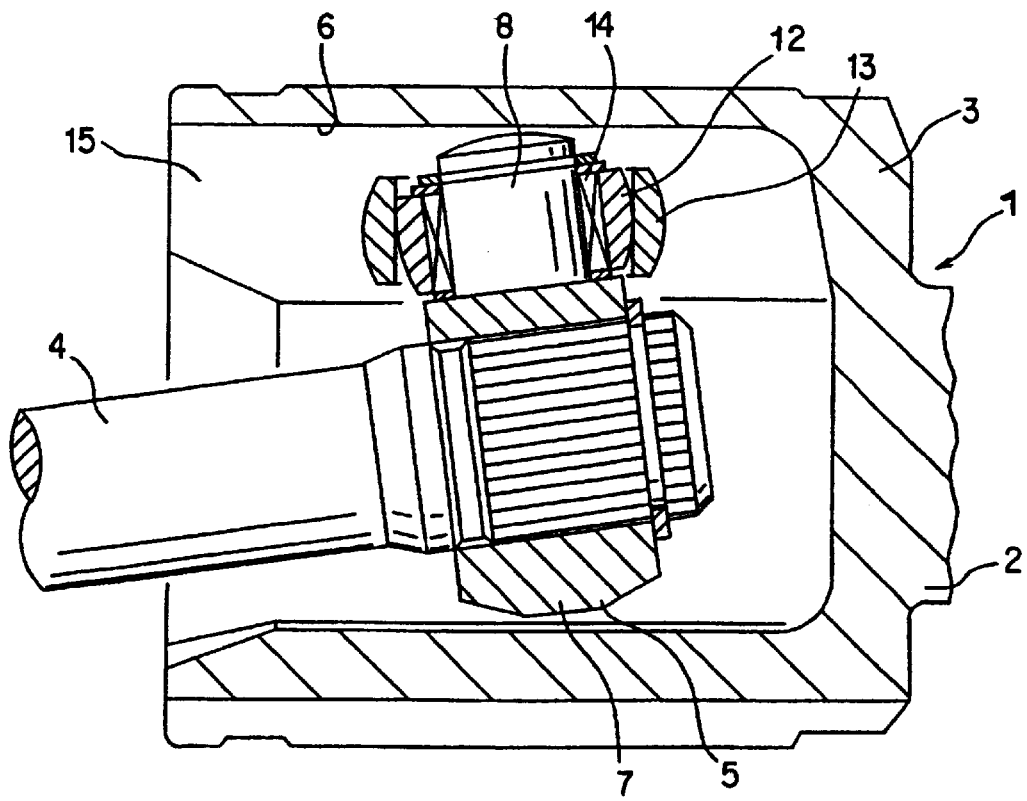
FIG. 5 is a cross sectional view of the example of FIG. 3 with the shaft tilted.
Figure 19:
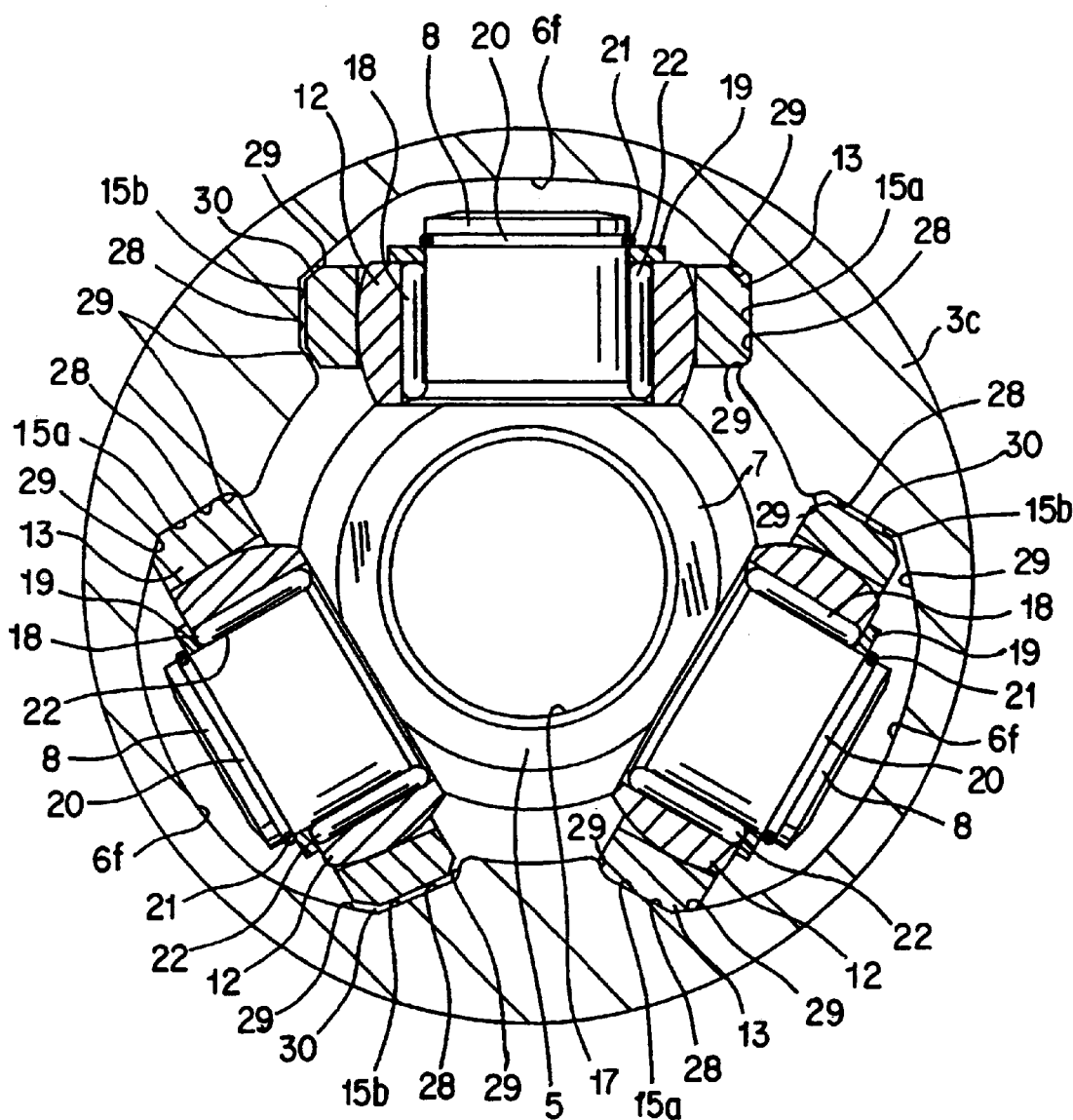
FIG. 19 is a cross sectional view of a third example of the second embodiment of the present invention.

FIG. 19 shows a third example of the second embodiment of the present invention. With this example, as with the conventional constructions shown in FIGS. 3 through 5, the inner rollers 12 are provided around the trunnions 8 with the outer roller 13 provided around the inner roller 12 such that the inner peripheral faces of the outer rollers 13 are made cylindrical in shape so that swinging as well as axial displacement of the respective outer rollers 13 relative to the respective inner rollers 12 is possible, in addition to being freely supported for rotation. Consequently, with this example, the effect of a drop in wear of the structural components obtained for the first embodiment is not obtained, however the effect of the second embodiment that is an improvement in transmission efficiency due to a drop in frictional resistance between the inner components is obtained with the present example. Other details of the construction and operation are the same as for the beforementioned first example.

Figure 20:
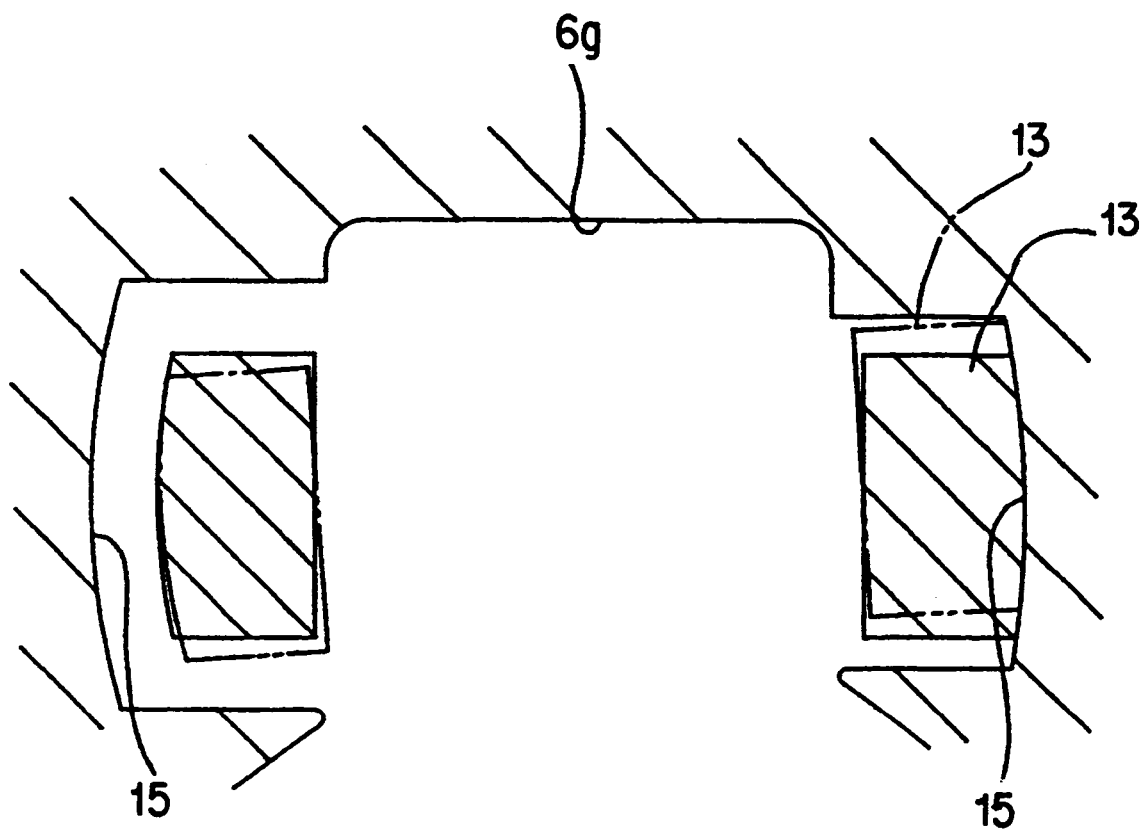
FIG. 20 is a schematic view of a fourth example of the second embodiment showing the relation between the side face of the outer ring and the side wall of the guide groove.

FIG. 20 shows a fourth example of the second embodiment of the present invention. With this example, the outer peripheral face of the outer roller 13 is formed as an arcuate convex face, and the respective guide grooves 15a, 15b are formed as arcuate concave faces in section. With this example, the outer rollers 13 are able to incline as shown by the chain line. Therefore, the width of the guide groove 15b on the tailing side is made sufficiently larger than the width of the guide groove 15a on the leading side in the rotation direction so that even when the outer rollers 13 are inclined, there is no rubbing engagement of the outer rollers 13 with the inner face of the guide groove 15b on the tailing side in the rotation direction.

With the tripod type constant velocity joint of the present embodiment, due to the above construction and operation it is possible to reduce the drive losses due to friction generated by the inner parts, and to improve transmission efficiency, and to also reduce the vibration generated at the time of drive transmission.

With the tripod type constant velocity joint of the second embodiment constructed as described above, the frictional resistance due to the rubbing contact between the outer peripheral surfaces of the respective outer rollers 13 and the inner surfaces of the guide grooves 15 is still variable, so that transmission efficiency better be improved. This is described as follows with reference to FIGS. 21 through 24.

When a rotational force is transmitted between the first rotating shaft 2 and the second rotation shaft 4 with their axes out of alignment as shown in FIGS. 1 and 2, then the three trunnions 8 of the tripod 5 swing back and forth about the boss 7.

On the other hand, the respective outer rollers 13 move back and forth only in the axial direction of the housing 3 (to the left and right in FIGS. 21 and 22) along the guide grooves 15. As a result, a force in a direction perpendicular to the guide grooves 15 is applied to the respective outer rollers 13.

Figure 21:
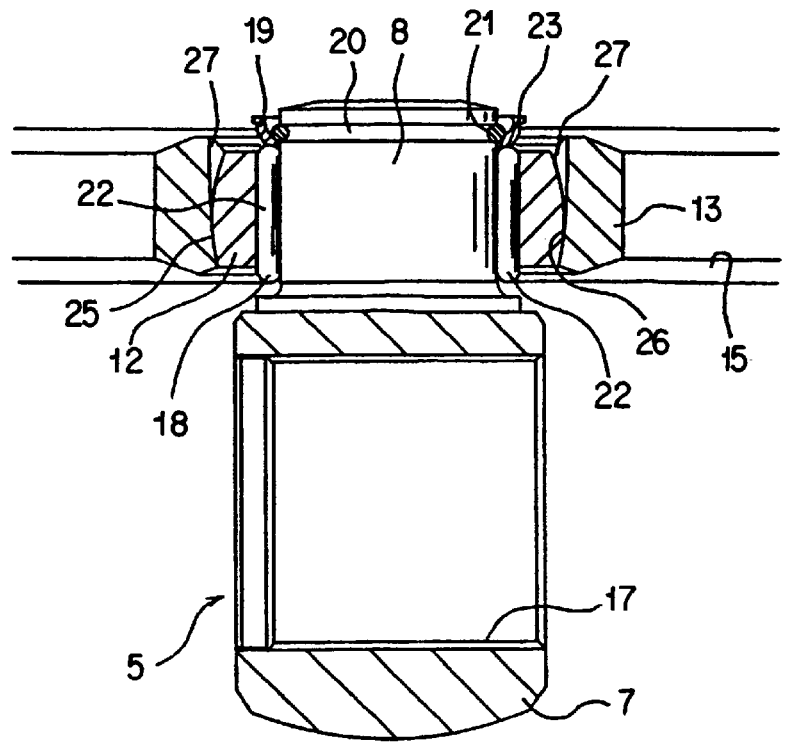
FIG. 21 is a cross sectional view similar to FIG. 7.
Figure 22:
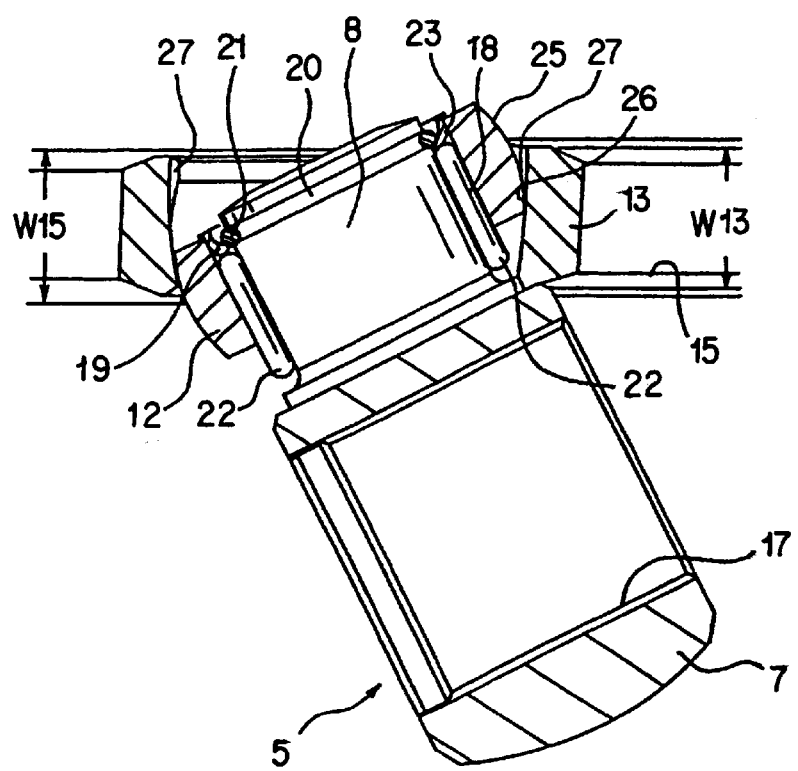
FIG. 22 is a cross sectional view similar to FIG. 8.

For example, when the trunnion 8 is displaced from the condition of FIG. 21 to the condition of FIG. 22, then a force in the pushing direction (upward direction in FIGS. 21 and 22) is applied to the outer rollers 13, so that the side surface of the outer roller 13 near the outer periphery is pressed against the side wall of the guide groove 15a at the radially outer side of the housing (the face portion of the outer rollers 13 farthest from the boss 7; the upper face in FIGS. 21 and 22).

On the other hand, when the trunnion 8 is displaced from the condition of FIG. 22 to the condition of FIG. 21, then a force in the pulling direction (downward direction in FIGS. 21 and 22) is applied to the outer roller 13, so that the side face of the outer roller 13 on the inner periphery side, is pressed against the side wall of the guide groove 15 at the radially inner side of the housing (the face portion on the side of boss 7; the lower face in FIGS. 21 and 22). This is the same as mentioned relating to the first embodiment in FIGS. 11 through 16.

Figure 23:
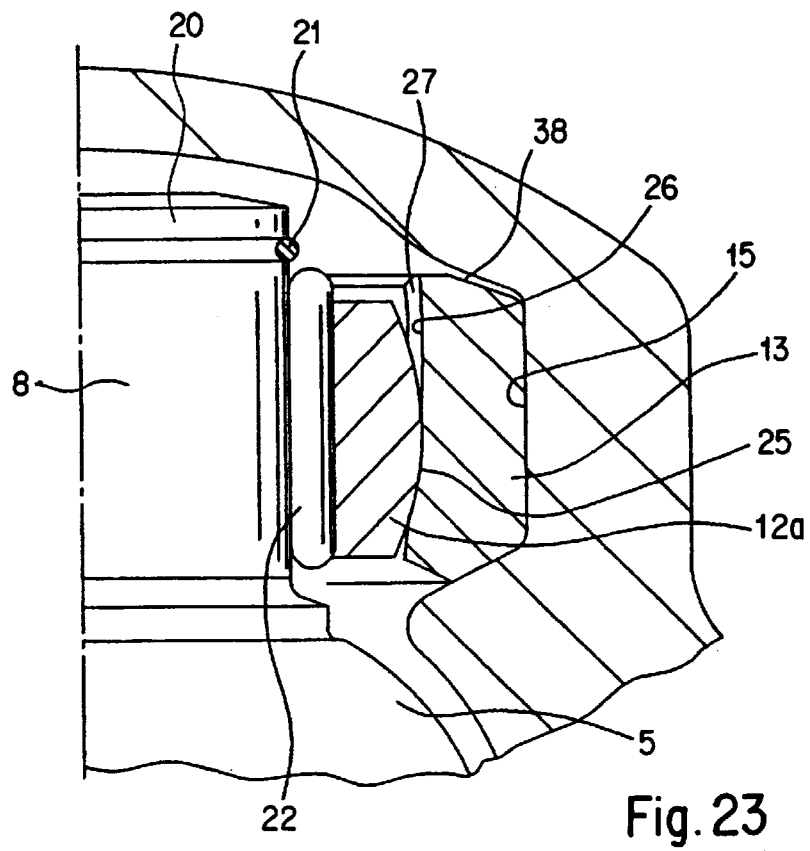
FIG. 23 is an enlarged cross sectional view of the bearing assembly.

On the other hand, as mentioned before, the width $W_{13}$ of the outer rollers 13 is made slightly less than the width $W_{15}$ of the guide grooves 15 ($W_{13} << W_{15}$). The reason for this is to prevent severe rubbing between the side face of the outer rollers 13 and the side wall of the guide grooves 15. Consequently, a small gap 38 as shown in FIG. 23, is formed between the side face of the outer rollers 13 and the side wall of the guide grooves 15.

Moreover, when the trunnions 8 swing about the boss 7, then a force acts on the outer rollers 13 in a direction inclined with reference to the guide grooves 15 due to the rubbing between the spherical convex surface 25 and the spherical concave surface 26. Consequently, due to the presence of this force and the gap 38, the outer rollers 13 becomes inclined with reference to the guide grooves 15 as shown exaggerated in FIG. 24.

When as described above the outer rollers 13 becomes inclined relative to the guide grooves 15, then due to the swing of the trunnions 8, the outer rollers 13 tends to ride up on the guide grooves 15, so that a large friction force acts between the inner face of the guide grooves 15 and the outer face of the outer rollers 13. As a result, the smooth rotation of the outer rollers 13 ceases to be carried out, so that not only are friction losses between inner parts of the tripod joint 1 increased and transmission efficiency of the tripod joint 1 reduced, but also the axial force applied to the trunnions 8 increases.

With this increase in axial force, then under severe conditions of use, for example when transmitting a large torque under large joint angle conditions, it is not always possible to suppress the occurrence of vibrations referred to as shudder.

The tripod type constant velocity joint of the following embodiment is made for preventing the generation of vibrations due to the above cause.

According to the present embodiment of the invention a constant velocity joint of a tripod type comprising a hollow cylindrical housing to be connected to a first rotating shaft, and a tripod contained in the housing so as to be connected to a second rotating shaft. The first rotating shaft has a joint angle relationship with the second rotating shaft. The housing has an inner peripheral surface formed with three recesses spaced apart from each other in a circumferential direction with a uniform space therebetween. Each of the recesses has an inner surface formed with first and second guide grooves each extending axially in the housing and having a flat bottom face. The tripod comprises a base portion through which the tripod is connected to the second rotating shaft, three trunnions with an axis each having a first end connected to the base portion and a second end extending to one of the recesses, and a bearing assembly mounted to the second end of each of the trunnions. The bearing assembly has an inner roller provided concentric with each of the trunnions, so that the inner roller is rotatable around the trunnion, and an outer roller fitted around the inner roller and having a short-cylindrical outer peripheral face received in the first and second guide grooves in the recess so that the outer roller is placed in a rolling contact relationship with the first and second guide grooves so as to be moved only axially in the housing, so that the outer roller has a rocking relationship with the inner roller.

The first and second guide grooves are formed such that the outer peripheral face of the outer roller is tightly pressed on the first guide groove when rotating force is transmitted through the first and second rotating shafts, and that the axis of each of the trunnions is displaced from a parallel relationship with the first bottom face of the first guide groove when the outer roller is pressed on the first guide groove with the joint angle between the first and second rotating shafts kept zero. With the tripod type constant velocity joint of the present embodiment construction as described above, the planar portions which are pressed by the outer peripheral faces of the respective outer rollers are out of parallel with the axes of the respective trunnions under conditions of zero joint angle, and therefore at the time of rotation transmission, the outer faces on one side of the respective outer rollers are pressed against the inner faces on one side of the respective guide grooves.

Therefore, the incline of the outer rollers with reference to the guide grooves disappears, so that the rolling of the respective outer rollers along the respective guide grooves is carried out smoothly. As a result, not only is there a reduction in losses due to the friction generated at the inner parts of the tripod type constant velocity joint, and an improvement in transmission efficiency of the tripod type constant velocity joint, but also the occurrence of vibration referred to as "shudder" can be effectively suppressed.

Figure 25:
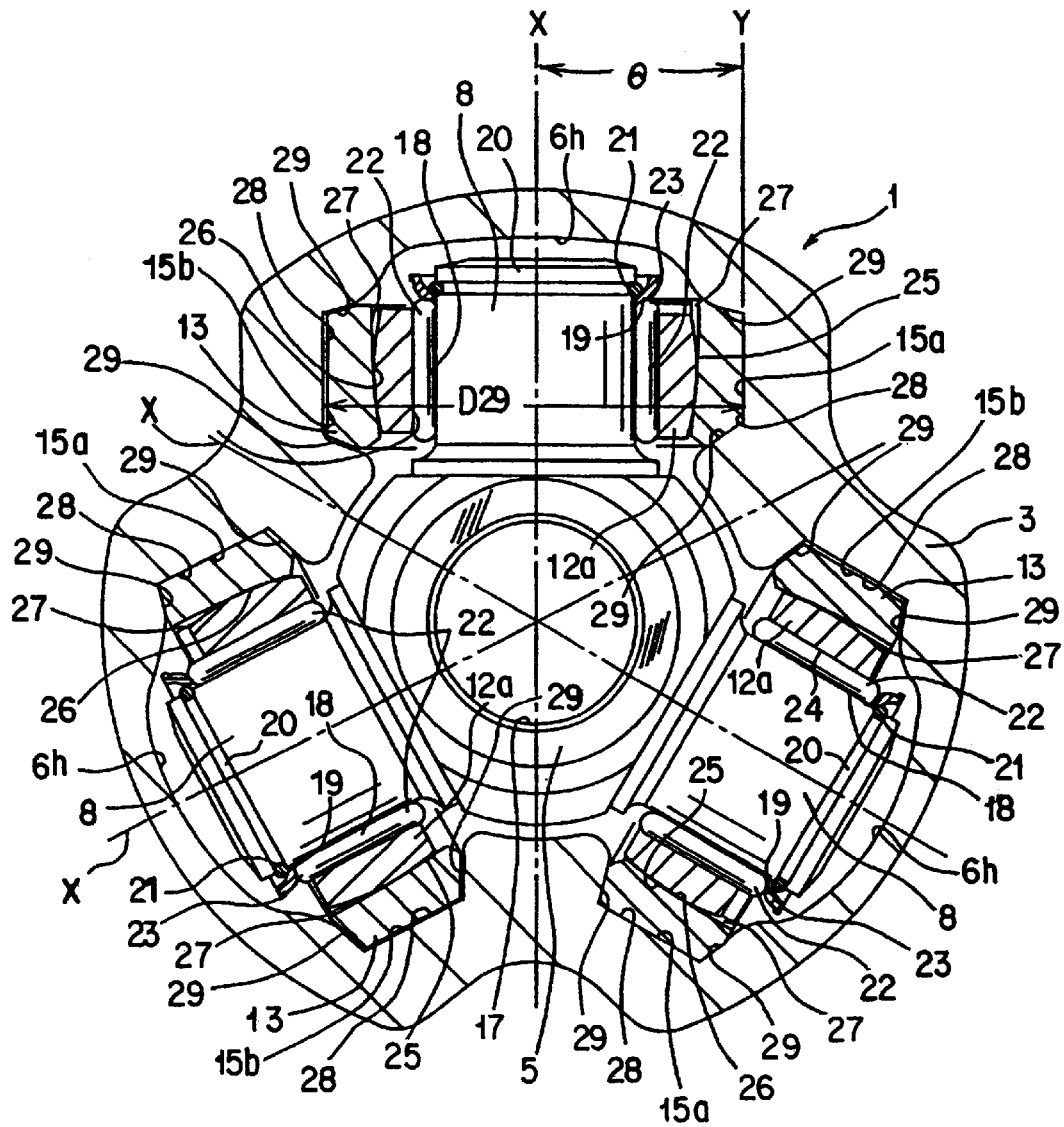
FIG. 25 is a cross sectional view of a third embodiment of the present invention.

FIG. 25 shows a first sample of a third embodiment of the present invention. The characteristic of the present embodiment is the construction for reducing the friction losses at the inner parts of the tripod type constant velocity joint, and for preventing the occurrence of vibration referred to as shudder, at the time of transmitting a rotational force under joint angle conditions.

In the case this example, the construction and operation of the other parts are substantially the same as for the construction of the first embodiment shown in FIGS. 6 through 8, and hence illustration and description related to similar components is either omitted or abbreviated, with the following description focusing on the characteristic parts of the present embodiment.

Figure 26:
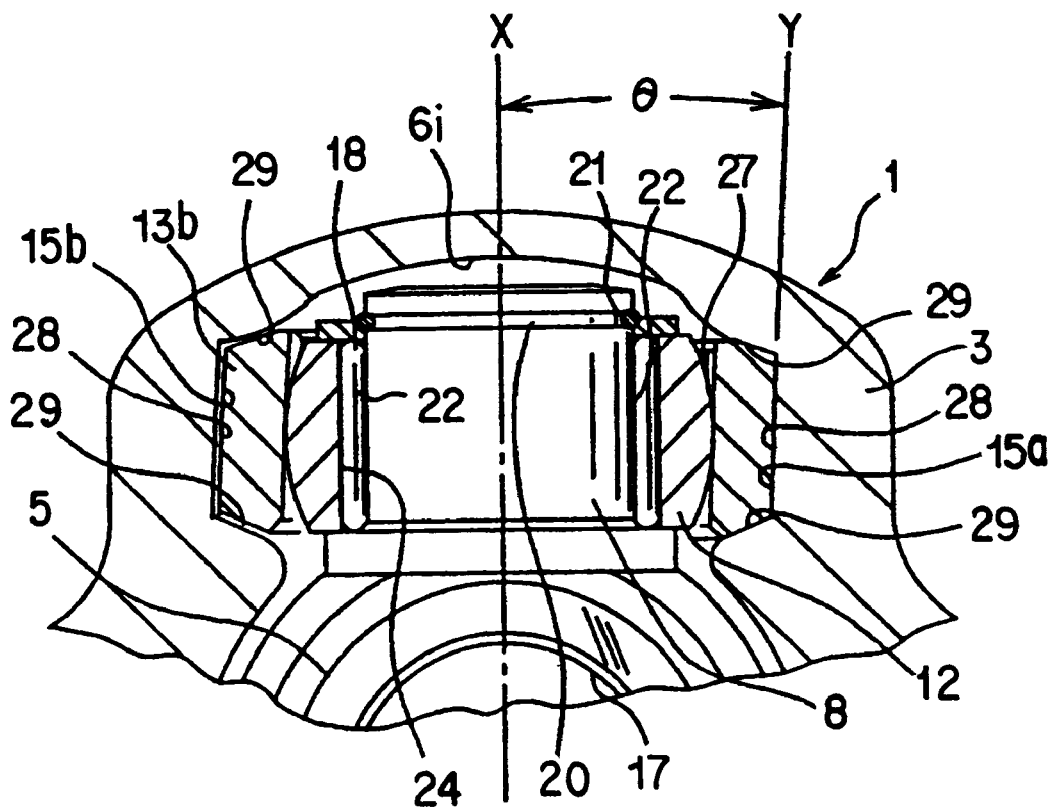
FIG. 26 is a cross sectional view of a first example of a third embodiment of the present invention which is similar to FIG. 25, but for one trunnion.

Comparing the construction of the present example shown in FIGS. 25 and 26 with the construction of the first embodiment shown in FIGS. 6 through 8, the shape of the housing 3 is different. However the differences in the shape of the housing 3 have no relation to the gist of the present invention.

Recesses 6h are formed at three locations on the inner peripheral face of the housing 3 at even circumferential spacing, with a pair of guide grooves 15a, 15b provided for each of the recesses 6h. The respective guide grooves 15a, 15b are formed as semi-trapezoid shape in cross-section by forming inclined wall portions 29 on opposite sides of widthwise central planar portions 28, with the width increasing towards the opening.

With the construction of the present example incorporated into a driven system of the automobile, then when the vehicle moves forward, the housing 3 and the tripod 5 rotate in the counter clockwise direction in FIG. 25. Consequently, as to the engaging portions between the guide grooves 15a, 15b and the outer rollers 13, the guide grooves 15a on the leading side in the clockwise direction and the short-cylindrical outer peripheral faces of the outer rollers 13 are abutted against each other, thus becoming the anchor side for transmitting the rotational force. On the other hand, the guide grooves 15b on the tailing side in the clock wise direction and the short-cylindrical outer peripheral faces of the outer roller 13 are separated from each other to form the non anchor side.

The three trunnions 8 provided on the tripod 5 are advanced respectively into the respective recesses 6h. In particular, in the case of the tripod type constant velocity joint of the present example, while carrying out transmission of the rotation force between the housing 3 and the tripod 5, the respective recesses 6h and the outer roller 13 are arranged unsymmetrically with the respective trunnions 8. That is to say, when the construction of the present example is incorporated into a drive system of an automobile and the vehicle moves forward as described above, then the housing 3 and the tripod 5 rotate in the counter clockwise direction in FIG. 25, so that the planar portions 28 of the guide grooves 15a on the tailing side in the rotation direction, being the anchor side, and the outer peripheral faces of the respective outer rollers 13 are abutted together.

In the case of the present example, the shape and the dimensions of the respective structural parts are specified, so that under conditions where the planar portions 28 and the outer peripheral faces of the respective outer rollers 13 are abutted against each other in the above manner with the joint angle being zero, then the axes of the respective trunnions 8 and the planar portions 28 of the guide grooves 15a on the anchor side, are inclined at an angle and faced to each other.

That is to say, as to the guide grooves 15a, 15b provided in pairs for each of the respective recesses 6h, the planar portions 28 constituting the bottom faces of the guide grooves 15 on the anchor side, and the axes X of the respective trunnions 8 are inclined at an angle θ, so as to be non parallel with each other. With the present example, the distance between an extension line Y of the respective planar portions 28 and the respective axes X is made so as to reduce in the radially outward direction of the housing 1.

The central axes X are inclined in the front and rear direction in FIG. 25 under conditions of a joint angle between the housing 3 and the tripod 5. Consequently, when the respective planar portions 28 and the central axes X of the trunnions 8 are not parallel with each other, the axis of the first rotating shaft 2 with the housing 3 fixed to the end portion thereof is in alignment with the axis of the second rotation axis 4 with the tripod 5 fixed to the end portion thereof under a zero joint angle condition.

With the tripod type constant velocity joint of the present embodiment construction as described above, the planar portions 28 which are pressed by the outer peripheral faces of the respective outer rollers 13, and the axes X of the respective trunnions 8 are out of parallel with each other under conditions of zero joint angle, and therefore at the time of rotation transmission, the outer faces on one side of the respective outer rollers 13 are pressed against the inner faces on one side of the respective guide grooves 15a, 15b. The reason for this is as follows.

At the time of transmitting a rotation force, then as to the respective guide grooves 15a, 15b, the planar portions 28 of the guide grooves 15a on the anchor side press against the outer peripheral faces of the respective outer rollers 13. Furthermore, as a reaction effect, the outer peripheral faces of the respective outer rollers 13 are pressed against the respective planar portions 28.

With the tripod type constant velocity joint of the present embodiment, as the respective planar portions 28 and the central axes X of the respective trunnions 8 is out of parallel with each other, a component of force is produced in the direction of axial displacement of the respective outer rollers 13. Furthermore, due to this component of force, the respective outer rollers 13 are displaced together with the inner rollers 12 in the axial direction of the trunnions 8, and press against one of the inclined portions 29 on the side faces of the guide grooves 15a.

More specifically, the respective outer rollers 13 are displaced to the side where the distance between the planar portions 28 and the axes X of the trunnions 8 is widened. Consequently, with the present example, the side face of the outer rollers 13 and one of the inclined portions 29 on the inner face of the guide grooves 15a are abutted together at the radially inner portion of the constant velocity joint 1. With the radially outer portion of the constant velocity joint 1, there is always a gap 38 (see FIG. 23) between the side face of the outer rollers 13 and the other inclined wall portion 29 of the guide grooves 15a.

Therefore, the incline of the direction in which the respective outer rollers 13 roll, to the lengthwise direction of the respective guide grooves 15a (the front and rear direction in FIG. 25) disappears, so that the rolling of the respective outer rollers 13 along the respective guide grooves 15a is carried out smoothly. As a result, not only is there a reduction in losses due to the friction generated at the inner parts of the tripod type constant velocity joint, and an improvement in transmission efficiency of the tripod type constant velocity joint, but also the occurrence of vibration referred to as "shudder" can be effectively suppressed.

The planar portions 28 of the guide grooves 15b on the non anchor side are parallel with the planar portions 28 of the guide grooves 15a on the anchor side. Moreover, the guide grooves 15a, 15b provided in pairs for each of the respective recesses 6h are formed symmetrical with each other relative to a straight line parallel with the extension line Y. This is done in consideration of the axes of the respective outer rollers 13 being inclined with respect to the axis of the respective trunnions 8, at the time of power transmission, so as to prevent the rubbing together of the outer peripheral faces of the respective outer rollers 13 and the planar portions 28 on the non anchor side. That is to say, when the outer peripheral faces of the respective outer rollers 13 and the planar portions 28 on the non anchor side rub against each other, then the rotation resistance on the respective outer rollers 13 is increased, so that the power losses in the constant velocity joint 1 are increased and the axial force is increased. Therefore, by inclining the planar portions 28 of the guide grooves 15b on the non anchor side in the beforementioned direction, then the increase in power losses and axial force can be prevented.

Furthermore, as with the example shown in the figures, in the case where the respective guide grooves 15a, 15b are formed in a semi-trapezoid cross-sectional shape (rather than the semi-rectangular cross-section shape shown in FIGS. 6 through 8), incorporating the planar portions 28 and the inclined portions 29, then a reduction in the power losses due to the friction generated at the inner parts of the tripod type constant velocity joint can be even further ensured, and the transmission efficiency for the tripod type constant velocity joint improved.

That is to say, since the cross-sectional shape of the respective guide grooves 15a, 15b is formed in the abovementioned trapezoidal shape, then the inner surfaces of the guide grooves 15b of the non anchor side are not placed in sliding contact with the outer surfaces of the respective outer rollers 3 over the whole range of swing of the respective trunnions 8. In other words, there is only a sliding contact between one side of the inner faces of the guide grooves 15a on the anchor side and one side of the outer faces of the respective outer rollers 13.

That is to say, the outer diameter $D_{13}$ (refer to FIG. 6) of the respective outer rollers 13 is made slightly smaller than the distance $D_{15}$ between the two planar portions 28 of the guide grooves 15a, 15b formed as pairs for each of the respective recesses 6 ($D_{13}<D_{15}$).

Consequently at the time of power transmission, the outer surfaces of the respective outer rollers 13 abut against the inner surfaces of the guide grooves 15a on the anchor side but are separated from the inner surfaces of the guide grooves 15b on the non anchor side.

It should be noted that with the guide grooves 15 of a rectangular shape in cross-section as shown in FIGS. 6 through 8, there can be cases where the outer surfaces of the respective outer rollers 13 are not always separated from the inner surfaces of the guide grooves 15 on the anchor side, so that the power losses inside the constant velocity joint increase.

On the other hand, with the present example, the sliding contract between the inner surfaces of the guide grooves 15b on the non anchor side and the outer surfaces of the respective outer rollers 13 is prevented, so that the power losses inside the constant velocity joint can be kept small.

Moreover, with the construction of the present example, and as with the case of a second example to be described hereunder, the axes X of the trunnions 8 and the extension lines Y of the planar portions 28 can be inclined to each other in a direction such that the distance between the axis X and the extension line Y increases in the radially outward direction.

FIG. 26 shows a second example of a third embodiment of the present invention. With this example, in contrast to the case of the beforementioned first example, the extension line Y of the respective planar portions 28 of the guide grooves 15a on the anchor side is inclined to the axis X of the trunnions 8 at an angle θ such that the distance between the extension line Y and axis X increases radially outward. Consequently with this example, at the time of transmission of a rotational force, the outer rollers 13 are displaced in the radially outward direction where the distance between the planar portions 28 and the axes X of the respective trunnions 8 increases. As a result, with this example, the outer faces of the outer rollers 13 and one of the inclined portions 29 of the inner surfaces of the guide grooves 15a are abutted together at the radially outer portion of the constant velocity joint 1. In the radially inner portion of the constant velocity joint 1, there is always a gap 38 (refer to FIG. 23) between the side faces of the outer rollers 13 and the other inclined wall portions 29 of the guide grooves 15a.

With this example, the inner peripheral faces of the outer rollers 13 are formed cylindrical, and by engagement of the cylindrical faces with the outer peripheral faces in a spherical convex shape of the inner rollers 12, the outer rollers 13 are supported about the inner rollers so as to swing freely and be movable in the axial direction of the trunnions 8. Other details of the construction and operation are the substantially same as for the case of the abovementioned first example.

Also with the first example described above, as well as with the second example described above, the incline angle θ between the extension line Y and the axis X, is specified designwise from the point of generating a minimum component of force required to displace the outer rollers 13 in the axial direction of the trunnions 8.

Figure 24:
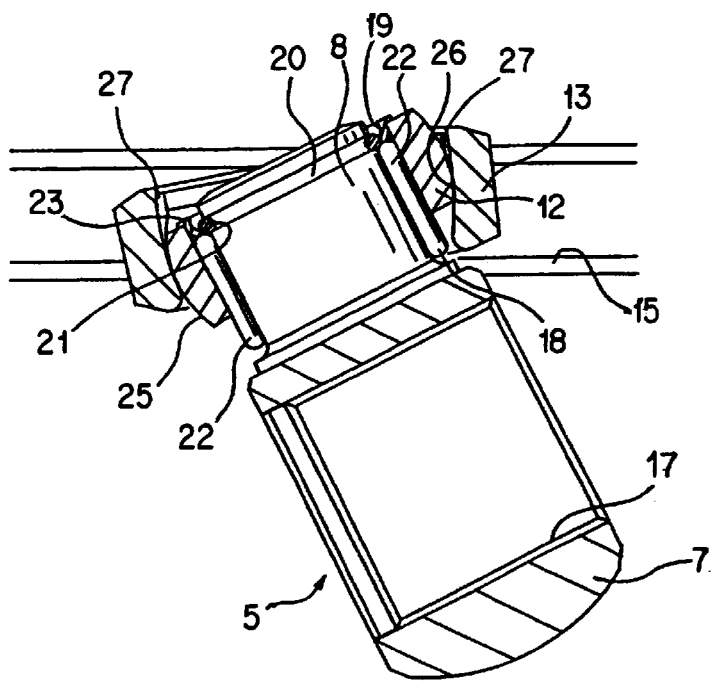
FIG. 24 is a cross sectional view similar to FIG. 8.

That is to say, if the incline angle θ is too small, then the component of force becomes too small so that the respective outer rollers 13 cannot be displaced axially on the trunnions 8, and as shown in FIG. 24, the effect of preventing inclination of the outer rollers 13 becomes inadequate, so that the axial force acting on the respective trunnions 8 is increased. On the other hand, if the incline angle θ is too large, then the component of force becomes too large so that the contact force between one of the side faces of the outer rollers 13 and one of the side faces of the guide grooves 15a becomes too large, so that the rolling of the outer rollers 13 cannot be carried out smoothly, that is to say, the axial force acting on the respective trunnions 8 increases. The connection between this increase in axial force and vibration is as described above.

Figure 27:
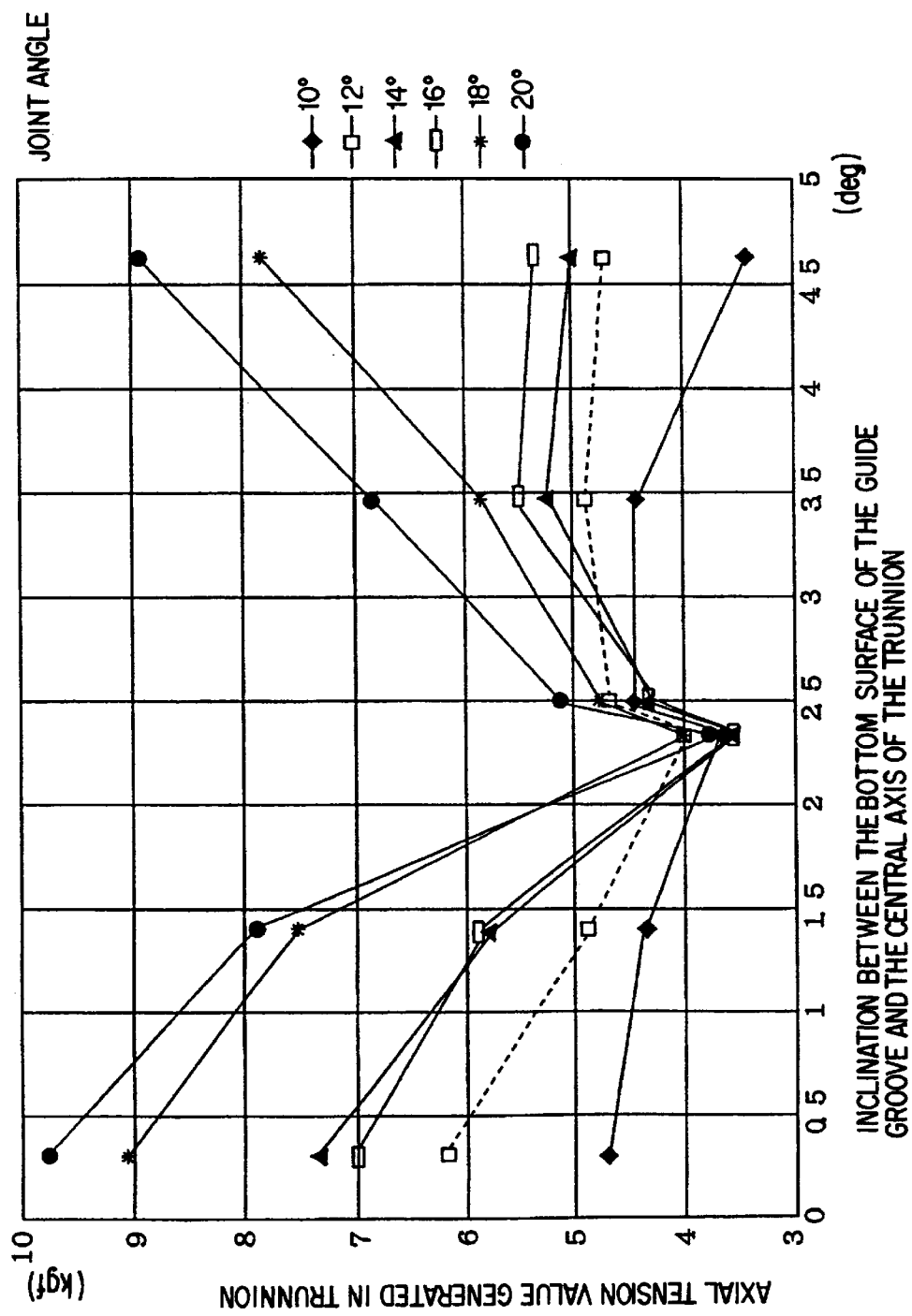
FIG. 27 is a graph showing a relationship between the axial Tension Value in Trunnion and Inclination between the bottom surface of the guide groove and the central axis of the trunnion.

According to the experiments carried out by the present inventors, it was found that if the incline angle θ is specified to be within the range from 1.5 to 3.5 degrees and more preferably within the range from 2 to 3 degrees, then the axial force acting on the respective trunnions 8 can be suitably reduced. FIG. 27 shows the results of the experiments. The experiments were carried out with the construction shown in FIG. 25, however it was clear that the construction shown in FIG. 26 would also give the same trend.

In FIG. 27, the horizontal axis represents the incline angle θ while the vertical axis shows the magnitude (axial force value) of the axial force generated in the trunnions 8. These experiments were carried in six sets with the intersection angle (joint angle) between the axis of the housing 3 and the axis of the tripod 5 changed by two degrees over the range from 10 through 20 degrees. The joint angles for the curves are shown on the right of FIG. 27.

As is clear from FIG. 27, if the incline angle θ is specified to be in the range from 1.5 to 3.5 degrees and more preferably in the range from 2 to 3 degrees, then the axial force acting on the respective trunnions 8 can be sufficiently reduced. Moreover, the effect of reducing the axial force by setting the abovementioned incline angle θ becomes more pronounced the greater the magnitude of the joint angle.

As is clear from the above description, the present embodiment prevents the generation of vibration, referred to as shudder, under conditions of a large joint angle. Specifying the direction of the bottom face of the guide groove under conditions for zero joint angle, is for the sake of convenience in representing the incline direction of the bottom face.

The tripod type constant velocity joint of the present embodiment is constructed and operated as described above, and hence power losses due to friction generated at the inner parts are reduced with transmission efficiency improved, and also vibration generated at the time of power transmission can be reduced.

What is claimed is:

1. A constant velocity joint of a tripod type comprising:
   a hollow cylindrical housing to be connected to a first rotating shaft,
   a tripod contained in the housing so as to be connected to a second rotating shaft,
   the first rotating shaft having a joint angle relationship with the second rotating shaft,
   the housing having an inner peripheral surface formed with three recesses spaced apart from each other in a circumferential direction with a uniform space therebetween,
   each of the recesses having an inner surface formed with first and second guide grooves each extending axially in the housing and having a flat bottom face,
   the tripod including a base portion through which the tripod is connected to the second rotating shaft, three trunnions with an axis each having a first end connected to the base portion and a second end extending to one of the recesses, and a bearing assembly mounted to the second end of each of the trunnions,
   the bearing assembly having an inner roller provided concentric with each of the trunnions and having an inner peripheral face and an outer peripheral face, so that the inner roller is rotatable around the trunnion, and an outer roller fitted around the inner roller and having a short-cylindrical outer peripheral face, an outer side face portion adjacent the outer peripheral face and an inner peripheral face, the outer peripheral face and side face portion of the outer roller received in the first and second guide grooves in the recess so that the outer roller is placed in a rolling contact relationship with the first and second guide grooves so as to be moved only axially in the housing, and the inner peripheral face of the other roller engaged with the outer peripheral face of the inner roller, so that the outer roller has a rocking relationship with the inner roller,
   the first and second guide grooves formed such that the outer peripheral face of the outer roller is pressed on the first guide groove with a clearance formed generally between the outer peripheral face and side face portion of the outer roller and the second guide groove when rotating force is transmitted through the first and second rotating shafts, and
   that the axis of each of the trunnions is displaced from a parallel relationship with the flat bottom face of the first guide groove when the outer roller is pressed on the first guide groove with the joint angle between the first and second rotating shafts kept zero.

2. The constant velocity joint of claim 1; wherein the flat bottom face of the guide grooves is inclined at an angle between 1.5 to 3.5 degrees with reference to the axis of the trunnion.

3. The constant velocity joint of claim 1; wherein each of the inner rollers is supported by the trunnion with a plurality of needle bearings therebetween so as to be rotatable around the trunnion and movable axially along the trunnion, the inner roller has a spherical convex outer peripheral surface while the outer roller has a spherical concave inner peripheral surface to mate the spherical convex outer surface, so that the outer roller is supported by the inner roller in a rocking member.

* * * * *